(12) United States Patent
Sunshine

(10) Patent No.: US 8,646,938 B1
(45) Date of Patent: Feb. 11, 2014

(54) DISTRESS MARKER SYSTEM

(76) Inventor: Morton Sunshine, Hollywood, FL (US)

(*) Notice: Subject to any disclaimer, the term of this patent is extended or adjusted under 35 U.S.C. 154(b) by 69 days.

(21) Appl. No.: 13/551,472

(22) Filed: Jul. 17, 2012

Related U.S. Application Data

(63) Continuation-in-part of application No. 12/427,720, filed on Apr. 21, 2009, now Pat. No. 8,220,950.

(51) Int. Cl.
*F21L 4/02* (2006.01)

(52) U.S. Cl.
USPC ........... 362/184; 362/202; 362/205; 362/208; 362/221; 315/291; 315/312

(58) Field of Classification Search
USPC .......... 362/184, 202, 205, 206, 221; 315/291, 315/307, 312
See application file for complete search history.

(56) References Cited

U.S. PATENT DOCUMENTS

| | | | |
|---|---|---|---|
| 6,095,661 A * | 8/2000 | Lebens et al. | 362/184 |
| 6,190,025 B1 * | 2/2001 | Solinsky | 362/394 |
| 6,598,998 B2 * | 7/2003 | West et al. | 362/307 |
| 7,723,921 B2 * | 5/2010 | West | 315/200 A |
| 7,731,385 B2 * | 6/2010 | Spartano et al. | 362/197 |
| 2005/0135092 A1 * | 6/2005 | Leslie et al. | 362/227 |
| 2005/0180130 A1 * | 8/2005 | Harris et al. | 362/184 |

\* cited by examiner

*Primary Examiner* — Ali Alavi
(74) *Attorney, Agent, or Firm* — Allen D. Hertz, P.A.; Allen D. Hertz

(57) ABSTRACT

A portable distress light including a plurality of light emitting diodes (LED's) and a light mode switch to power the diodes so as to provide at least one of, and preferably at least two of, a flashing white light, a flashing infrared light, a flashing blue light, a flashing colored light, a steady colored light, and a steady white light. The LED's are segmented into two circuits, each circuit strobing the respective LED's, where the additive illumination of the LED's creates a single extended illumination period and a respective single dark period. The single extended illumination period can be generated by a series of quick illuminating cycles of the LED's of each of the two circuits, thus providing multiple illuminating pulses to create the single extended illumination period.

20 Claims, 16 Drawing Sheets

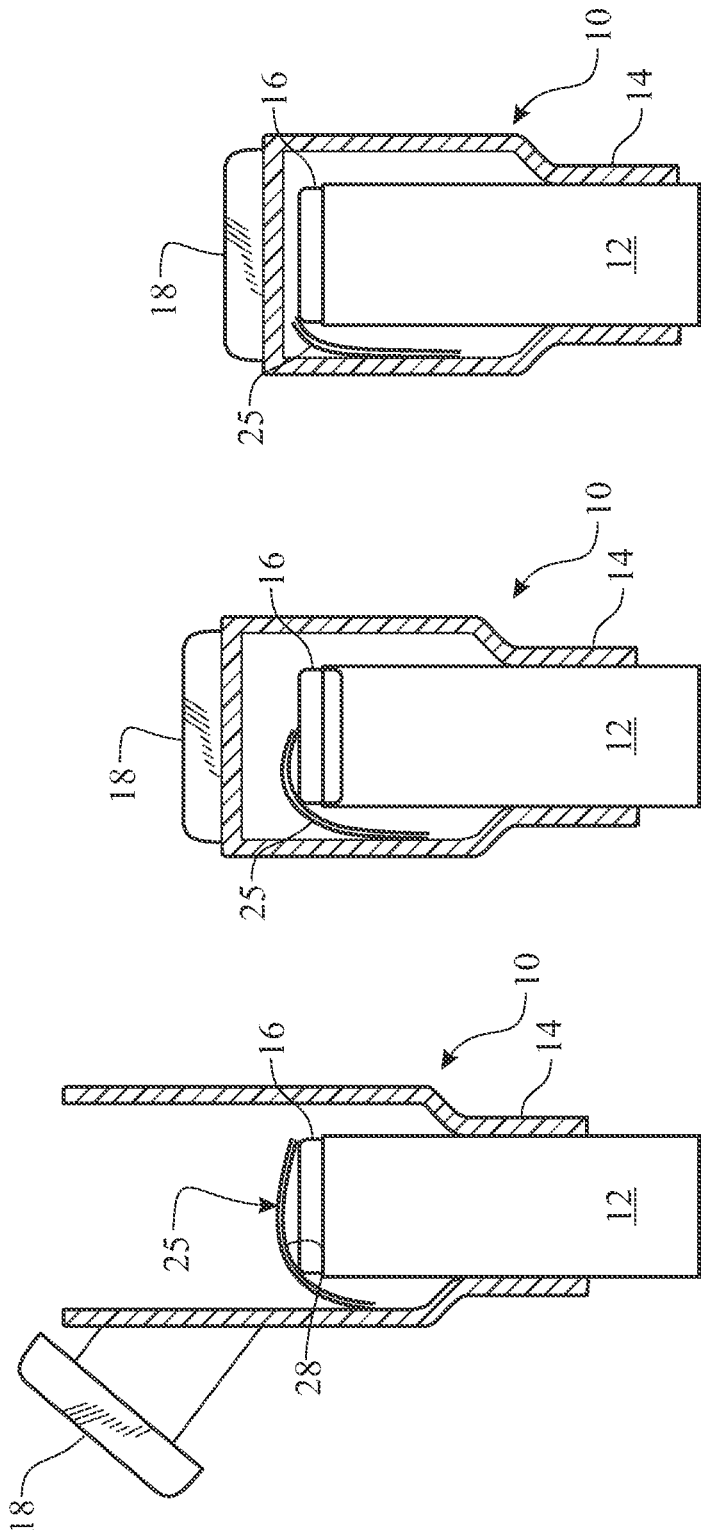

DISTRESS MARKER SYSTEM

CROSS-REFERENCE TO RELATED APPLICATION

This Non-Provisional Utility application claims the benefit of U.S. Provisional patent application Ser. No. 12/427,720, filed on Apr. 21, 2009, which will be issuing as U.S. Pat. No. 8,220,950 on Jul. 17, 2012, and is incorporated herein in its entirety.

FIELD OF INVENTION

The present invention relates to lighting devices, and more particularly, to a portable distress-signaling device including multiple light emitting diodes (LED's) that are selectively operated by electronic circuitry to provide visual aid in search and rescue operations on land and at sea for both military and civilian operations.

BACKGROUND OF THE INVENTION

There are a number of distress signaling devices that are readily available to imperiled individuals who may be lost at sea or on land as a means of summoning search and rescue operations. The vast oceanic environment and large global landscape makes it extremely difficult to locate one or more individuals who may be lost. Search operations are frequently conducted by marine vessels, aircrafts, and land vehicles in an effort to cover a larger search area. Search teams often face difficult challenges and a variety of hurdles as they undergo their searching efforts. For example, the difficulty of finding lost individuals are often compounded by oceanic waves and debris, and natural land obstacles such as trees, brushes, and hills. Bad weather conditions can also hinder the search, thus increasing the amount of time spent searching.

Locating lost individuals can be even more challenging during military combat or operations. In military action, its important for the individual requesting aid to provide a discrete, distress signal without alerting the enemy of the location of the person, or surrounding search aircrafts or vehicles. In certain situations, a distress device may require a different mode of signaling during the night as opposed to daytime. Such devices must be durable, able to withstand extensive wear and tear resulting from exposure, handling, and use.

A large variety of rescue distress devices capable of generating a more visually intense distress signal have been adopted in an effort to overcome these challenging obstacles and to effectively locate an individual who is lost or in need of aid during civilian or military operations. Some examples of such distress devices include portable laser devices, flares, dyes, planar mirrors, incandescent, Xenon, or other strobe lights, and water-activated strobe lights. Most of these conventional devices have certain drawbacks, and many have limited use for military operations. For example, the portable laser devices are generally limited to a very narrow beam and therefore must be accurately aimed at the intended search and rescue personnel. Flares are temporary since they are active for only short periods of time. In addition, flares may have limited use in certain military situations since the flare provide strong visual effects readily seen by unfriendly forces. Planar mirrors are most effective in the presence of sunlight and thus are of limited or no use on cloudy days and during nighttime. Incandescent strobe lights are power inefficient. The water-activated strobe lights typically require water to generate power or activate to the operating circuit.

One popular prior art device is the portable strobe light as disclosed in Clark et al., U.S. Pat. No. 5,490,050. Clark et al. ('050) discloses a portable strobe light used in search and rescue emergency operations. The portable strobe light provides three different operating light modes. The portable strobe light includes a housing with a high intensity xenon bulb, which flashes white light. The portable strobe light includes mechanical interchangeable blue light and infrared light filters that are mechanically maneuvered about the housing to cover the xenon bulb so as to selectively provide an infrared or blue light. Though the portable strobe light may be useful in military operations, its functionality is limited by the use of moveable mechanical parts. Maneuvering the mechanical filters may be hindered over time as the portable strobe light is exposed to the weather, dust, dirt and grime. In addition, the moving parts are subject to damage or breaking when exposed to ongoing wear and tear.

Accordingly, there is a need in the art for a portable distress lighting device that is lightweight, durable, and includes a plurality of LED'S, efficiently arranged, to provide different signaling lights without the need for positioning mechanically maneuverable filters and a shield. There is also a need for a portable distress lighting device that includes a selective mode of operation with corresponding status indicators.

SUMMARY OF THE INVENTION

The present invention overcomes the deficiencies of the known art and the problems that remain unsolved by providing a portable distress marker system that includes a plurality of light emitting diodes (LED's) that are particularly arranged on a printed circuit board (PCB) and coupled to a power switch and mode switch to provide a flashing white light, a flashing infrared light, a flashing blue light, and a steady white light.

In accordance with the present invention, there is provided a portable distress light comprising a housing holding a power source and a circuit, a light assembly disposed on one end of the housing, where the light assembly includes a plurality of light emitting diodes coupled to the circuit, a transparent cover disposed over the plurality of light emitting diodes, a mode switch electrically coupled to the circuit for selectively powering the plurality of light emitting diodes to provide different lighting modes, a plurality of status indicators where each status indicator corresponds to the lighting mode selected, and a power switch electrically coupling the power source to the circuit for operating the LED's.

In an alternative embodiment there is provided a portable distress light including a plurality of light emitting diodes and a light mode switch to power the diodes to provide a flashing white light, a flashing infrared light, a flashing blue light and a steady white light. Status indicators are included on the device to correspondingly identify the operative mode in operation. The light emitting diodes include top-emitting diodes and side-emitting diodes that are arranged on a printed circuit board in a variety of configurations to provide an optimum light pattern. Exemplary configurations include positioning the light emitting diodes into a triangular pattern, a square pattern or a rectangular pattern. The distress device may further include a variety of reflectors that are disposed over the light emitting diodes to provide a horizontally dispersed light pattern.

An alternative embodiment provides a distress light including a cylindrically shaped form having a top clear cover attached to a cylindrical body. The cylindrically-shaped device may be used where a smaller volume rescue aid is necessary.

BRIEF DESCRIPTION OF THE DRAWINGS

The invention will now be described, by way of example, with reference to the accompanying drawings, in which:

FIGS. 3A through 3C are side elevation views of the portable strobe light of FIG. 1, showing the operative positioning of a blue filter over the top cover, in accordance with known prior art;

Like reference numerals refer to like parts throughout the various views of the drawings.

DETAILED DESCRIPTION OF INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
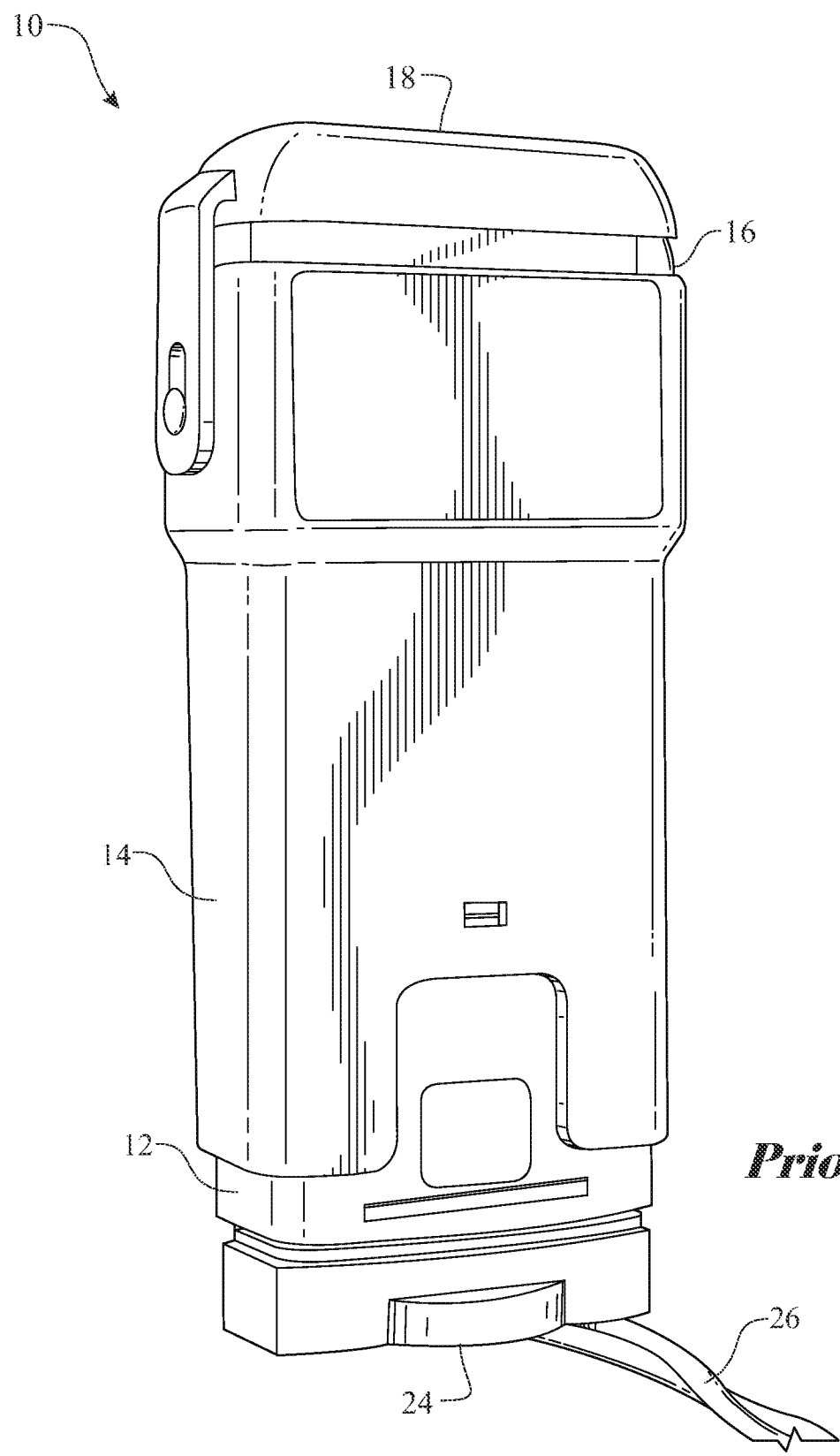
FIG. 1 presents an isometric rear view of a portable strobe light, in accordance with known prior art.

Referring now to the drawings wherein like elements are represented by like numerals throughout, there is shown in FIG. 1, an isometric rear view of a portable strobe light, in accordance with known prior art. The portable strobe light 10 is designed to be used in both military and civilian operations. The strobe light 10 includes a body 12 and a guard 14 including an opening that is correspondingly sized to slideably receive the body 12 therein. Both the body 12 and the guard 14 comprise a generally rectangular shape, wherein each can be fabricated from a durable, plastic material. The body 12 includes a chamber (not shown) for housing a power source, such as batteries. The chamber is accessed via, a closure 24. A light-emitting element or bulb, such as a xenon bulb, (not shown) is positioned on the top end of the body 12 to emit a visible white light. A clear, transparent cover 16 is disposed over the light emitting bulb to protect the bulb from damage while allowing white light to transmit through the clear, transparent cover 16. An operating circuit is housed within the body 12 for operating the xenon bulb.

The portable strobe light 10 further includes an infrared (IR) filter 18 that is manually pivotable over the light emitting the bulb cover 16 to emit an infrared (IR) light. The IR filter 18 is preferably made of a plastic material and acts to filter visible light at a particular wavelength allowing IR emitted frequencies to pass through the IR filter 18. Because the IR light is invisible to the naked eye, a user is able to use the strobe light 10 in military combat thereby avoiding the possibility of detection and exposure that would likely be caused by the bright white light. As illustrated in FIG. 1, the portable strobe light 10 further includes a lanyard 26 for easily carrying the portable strobe light 10 by hand, around the neck of a person, attaching the portable strobe light 10 to a surface or object, and the like, as desired.

Figure 2A:
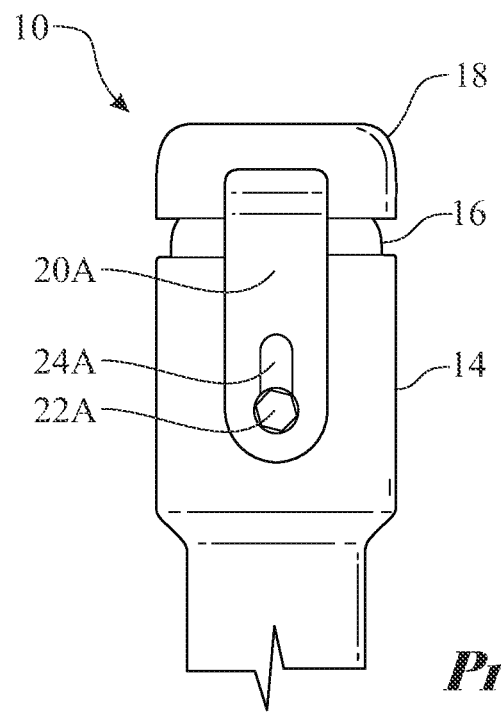
FIG. 2A presents a side elevation view of the portable strobe light of FIG. 1, showing an infrared filter operatively positioned over a top cover, in accordance with known prior art.
Figure 2B:
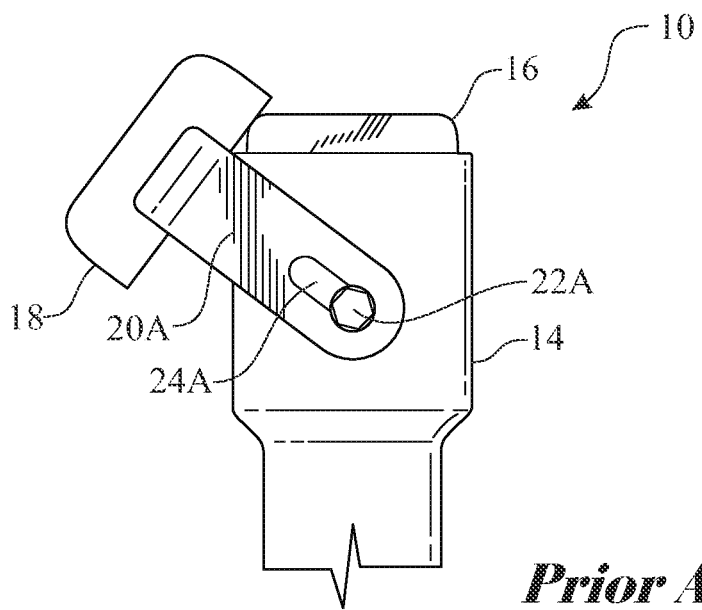
FIG. 2B presents a side elevation view of the portable strobe light of FIG. 1, showing the infrared filter pivotally positioned away from the top cover, in accordance with known prior art.

Operation of the IR filter 18 is presented in the side elevation views of the portable strobe light illustrated in FIGS. 2A and 2B. The IR filter 18 generally comprises a concave shape to fit tightly over the convex shape of the bulb cover 16. It is noted, although the IR filter 18 would normally be lowered and provide a light seal about the bulb or bulb cover 16, the IR filter 18 is shown in a slightly raised position providing visual access to the bulb cover 16. The tight fit of both the IR filter 18 and the bulb cover 16 prevents visible light from escaping about the edges of cover 16. As seen, the IR filter 18 includes a pair of support members 20A, each support member 20A including an aperture 24A. A pair of mounting posts 22A is attached to the outer side surfaces of the guard 14, the mounting posts 22A are opposite each other. It will be noted that although reference is made to a singular support member, mounting post, and aperture, a second corresponding support member, mounting post, and aperture forming a pair is operatively included but not shown.

Each mounting post 22A correspondingly extends through each aperture 24A of each support member 20A to permit the IR filter 18 to pivot about the posts 22A between an operational position as shown in FIG. 2A, to a non-operational position in which IR filter 18 is manually pivoted away from the bulb cover 16 to allow white light to pass through the transparent cover 16, as better illustrated in FIG. 2B. Thus, by pivoting the IR filter 18 about the mounting post 22A, a user can manually select between a white light emitting position, and an infrared light emitting position.

Operation of a blue light filter assembly 25 is presented in the various sectional side elevation views of the portable strobe light 10 illustrated in FIGS. 3A, 3B, and 3C. As shown, the portable strobe light 10 includes an internally mounted blue light filter assembly 25. The blue light filter assembly 25 includes a resilient spring 26 attached adjacent to the thin, flexible plastic blue light filter 28 to form a naturally U-shaped bend. The resilient spring 26 includes a smaller dimension than the blue light filter 28 in a manner to avoid obscuring the lens area of the blue light filter 28. As seen, one end of the blue light filter assembly 25 is attached to the inner surface of the guard 14.

A blue light operating position is selected by manually pivoting the IR filter 18 into a non-operational position, as illustrated in FIG. 3A. The guard 14 is slideably pulled into an extended position, longitudinally, (i.e. the guard 14 is pulled upwardly while the body 12 remains fixed, or alternatively, the body 12 is pulled downwardly while the guard 14 remains fixed), such that the resilient spring 26 forces the blue light filter 28 to bend into a natural U-shaped position, eventually covering the top of the bulb cover 16 and subsequently covering the xenon bulb (not shown). Thus, when the guard 14 is fully extended, the blue light filter assembly 25 bends fully covering the bulb cover 16 to provide a blue light emitting position. The blue light can be used in combat during nighttime to emit a blue light beam without detection from the enemy.

As the guard 14 is slideably pushed downwards while the body 12 remains fixed, or alternatively, as the body 12 is pulled upwards while the guard 14 remains fixed, the resilient spring 26 forces the blue light filter 28 to retract from the top surface of the bulb cover 16, as better illustrated in FIGS. 3B and 3C. Thus, when the guard 14 is fully retracted, the blue light filter assembly 25 is fully displaced away from top surface of the bulb cover 16 so that both the resilient spring 26 and pliable blue light filter 28 are retracted into a straightened storage configuration, as seen in FIG. 3C. It will be noted that in FIGS. 3B and 3C, the IR filter 18 is manually pivoted into operational position over the bulb cover 16 to provide infrared light.

The known prior art provides a portable strobe light 10 that includes three operational light modes using manually activated light filters 18 and 25. A first operational light mode includes a white strobe light provided by a xenon bulb emitting bright white light through a clear cover 16 used for military or civilian search and rescue operations. A second operational light mode is provided by manually pivoting an IR filter 18 over the bulb cover 16 to provide infrared light used in military missions and to transmit infrared light to infrared viewers implemented by friendly forces. A third operational light mode is provided by manually pivoting the IR filter 18 into a non-operational mode, and extending the guard 14 fully to position a blue filter over the cover 16 to provide a blue light that may also be used in military combat. Thus, the prior art provides a portable strobe light 10 utilizes mechanical filters 18, 25 to selectively provide a white light, an infrared light or alternatively, a blue light.

Figure 4:
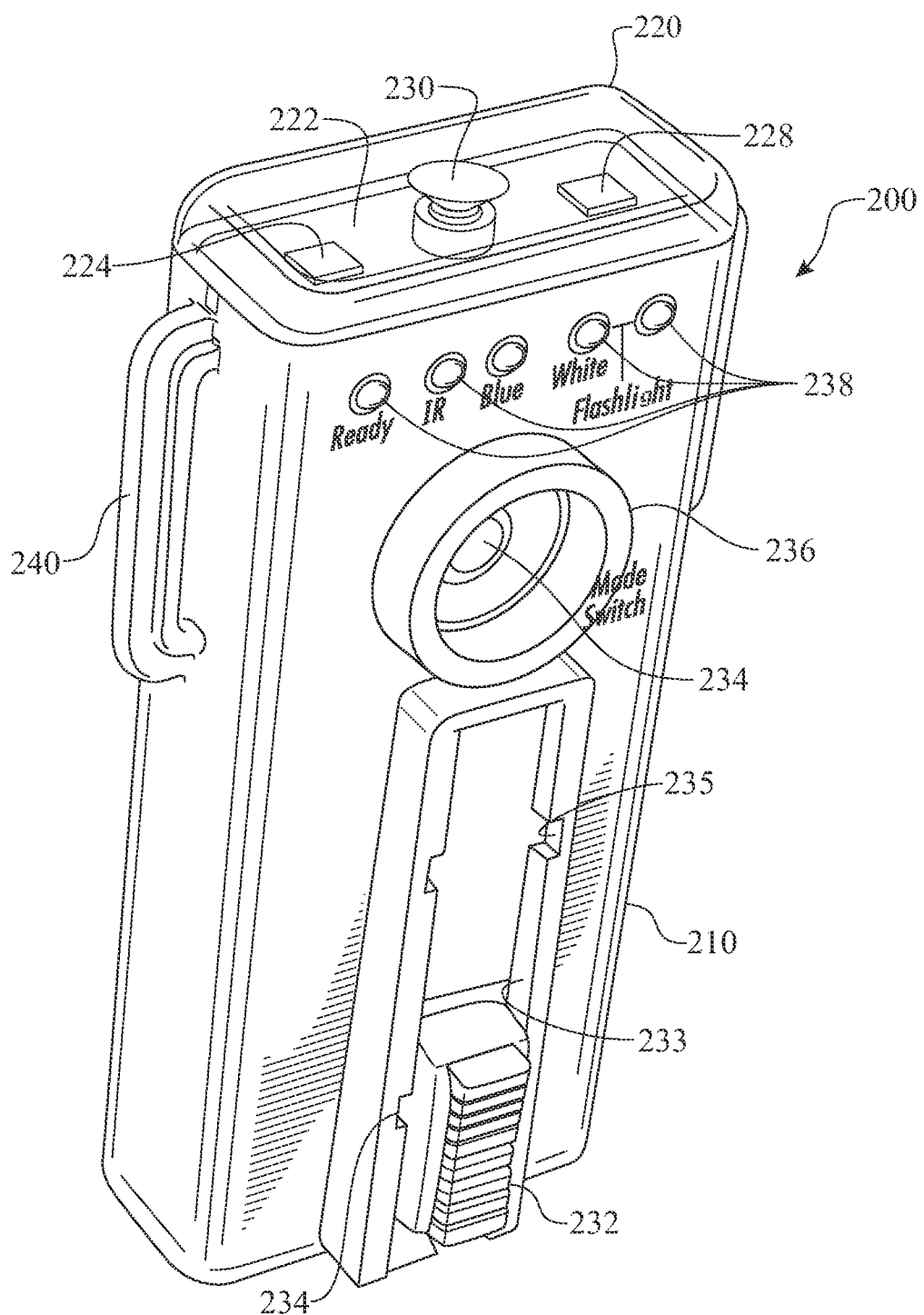
FIG. 4 presents an isometric view of a portable distress marker, in accordance with one embodiment of the present invention.

A first exemplary portable distress light 200 is introduced in FIG. 4. The distress light 200 includes a generally rectangular shaped body 210 that is fabricated from a durable, plastic material, such as a polycarbonate plastic, metal, and the like. The body 210 may comprise any color, and may include camouflage markings or colors. One or more holding elements 240 are disposed along one or more outer side surfaces of the body 210. In one exemplary embodiment, the holding element 240 may comprise a U-shaped member having an opening for receiving a cord, lanyard, strapping, and the like, therein for attaching the distress light 200 to a person or object. The distress light 200 further includes a light assembly 222, a top cover 220, a power switch 232, a mode switch 234, and a plurality of status indicators 238.

The cover 220 is fabricated from a clear, transparent, plastic material, and is fixedly disposed on top of the distress light 200 to cover the light assembly 222. The cover 220 protects the light assembly 222 from damage and provides a watertight seal to prevent water from entering into the cavity of the light assembly 222.

The body 210 of the distress light 200 includes a chamber that is dimensioned for housing an operating circuit and power source (not shown) for powering both the status indicators 238 and the light assembly 222. A representative example of a power source includes 2 or more batteries, such as CR-123 battery cells. Details of an exemplary power source are presented in FIG. 7, which is described below.

The light assembly 222 includes light emitting diodes (LED's) that replace the conventional xenon bulb of the known prior art. The light assembly 222 includes a plurality of LED's that are arranged in an innovative configuration to achieve a hemisphere of light. Each LED is carefully selected and electrically mounted to radiate light upwards and/or sideways. A plurality of LED's is arranged in a variety of different configurations to provide an effective, intense illumination. The LED's are selected to provide a flashing white light, a flashing infrared (IR) light, a flashing blue light, and a solid white flashlight. It will be noted that the plurality of LED's may be selected to provide other colors or variations, and powered to pulse, flash, strobe, or remain solid.

In one exemplary embodiment of the present invention, the light assembly 222 includes two top-emitting LED's 224, 228 and one side-emitting LED 230, as illustrated in FIG. 4. The configuration is such that the LED's 224, 228, 230 provides a hemisphere of emitted white light. One practical application for each top-emitting LED 224, 228 includes the use of the OVSPxBCR4 diode series from OPTEK Technology, Inc. as an exemplary component incorporated in the prototype. The OVSPxBCR4 diode series is a robust energy-efficient LED source that provides a 120 degree viewing angle, comprises a ultra-low profile, has a long operating life, and provides a variety of different emitting colors including blue, green, red, yellow, and the white LED, identified as part no. OVSPW-BCR4. Still, a practical application for the side-emitting LED 230 includes the use of the LUXEON III diode series from LumiLED's Lighting Company. More particularly, the Luxeon LXHL-DW09 LED is a light emitting diode that includes a top lens, and a body, and provides a side-emitting white light. The LXHL-DW09 LED is ultra-compact, provides long operating life, provides a variety of different emitting colors, is energy efficient, and requires low DC voltage to operate.

It will be noted that the present invention is not limited to a light assembly 222 having a particular number or arrangement of LED's. It is shown and contemplated that a number of LED's can be placed in different arrangements as described further to exemplary embodiments shown in FIGS. 5 through 11 below.

The distress-signaling device 200 further includes a waterproof, power switch 232 for selectively activating the LED's 224, 228, and 230. In one non-limiting example, the waterproof power switch 232 includes a magnetic slide switch often used in areas where spark proof switching is desired in the event the distress light 200 is used near combustible materials or environment that includes flammable products. A slide channel 233 is formed on the outer surface of the distress light 200 to guide the switch 232 along a longitudinal channel to operate the distress light 200 between ON and OFF positions. The slide channel 233 includes one or more detents 234, 235, for holding and locking the switch 232 securely into position. It will be noted that power switch 232 may include other suitable mechanical or electrical contact devices or switches.

The distress light 200 further includes a mode switch 234, as introduced in FIG. 4. The mode switch 234 may comprise a mechanical or electrical switch that includes waterproof features. An outer rubber, elastomer covering may be disposed over the mode switch 234 to prevent water, debris or dust from affecting the performance of the switch 234. A protection barrier 236 preferably surrounds the mode switch 234. The protection barrier 236 is included to prevent a user from accidentally depressing mode switch 234. For example, without the protection barrier 236, a user may accidentally hit mode switch 234 while in combat, activating an undesirable LED mode of operation, thus undesirably alerting the combat enemy. To prevent any accidental activation of the mode switch 234, the present invention offers the benefit of the protection barrier 236 that extends along an outer perimeter of the switch 233. The preferred protection barrier 236 is slightly raised upwards to provide an effective barrier.

A plurality of low current status light emitting diodes (SLED's) are disposed within the body 210 of the light 200 to indicate to a user the operative status of the light assembly 222. In one exemplary embodiment, the status indicators 238 include a ready light (Ready), an infrared indicator light (IR), a blue light indicator (Blue), a white light indicator (White) and a Flashlight indicator light (steady light). Each status indicator 238 corresponds to the operative mode selected, via mode switch 234, for powering the LED's.

In operative use, the distress light 200 is initially powered on by sliding the power switch 232 along the slide channel 233 into an "ON" position. It will be noted that powering on the distress light 200 simply activates the device 200 in the ready mode, unlike the prior art devices where once the unit is powered on, power is immediately applied to the xenon light bulb circuit. Placing the distress light 200 in the ready mode provides the user the necessary time to make the appropriate selection for the mode of operation before powering the various LED's thus, reducing or eliminating the risk of exposure during military combat or missions.

A mode of operation is selected by sequentially depressing the mode switch 234. In one non-limiting example, the mode switch 234 is pressed once to configure the LED arrangement into an infrared (IR) strobe mode. Pressing the mode switch 234 a second time places the distress light 200 into a blue strobe mode, pressing the switch 234 a third time establishes a white strobe mode, pressing switch 234 a fourth time configures a flashlight mode, pressing switch 234 a fifth time provides a back to ready mode, and the sequence repeats itself when repeatably depressing the mode switch 234.

As the mode switch 234 is depressed to select a desired mode of operation, the unit 200 changes the status of a corresponding status indicator 238, such as by illuminating a respective indicator. The status indicator 238 shows which function that has been selected by the user. In one exemplary embodiment, when the distress light 200 is in the ready mode, the ready status indicator would become illuminated. When distress light 200 is in the IR mode, the IR status indicator is RED. When the distress light 200 is in the Blue mode, the Blue status indicator is BLUE, when the light 200 is in the white strobe mode, the white status indicator is WHITE, and finally, when the distress light 200 is in the flashlight mode, both the white status indicator and flashlight status indicator are both illuminated. It will be noted that each status indicator LED is not limited to a particular color and that each LED status indicator may comprise a variety of different colors that may be pre-selected at the factory when assembling distress light 200. Preferably, the status indicator LED's are low current light emitting diodes.

Figure 5:
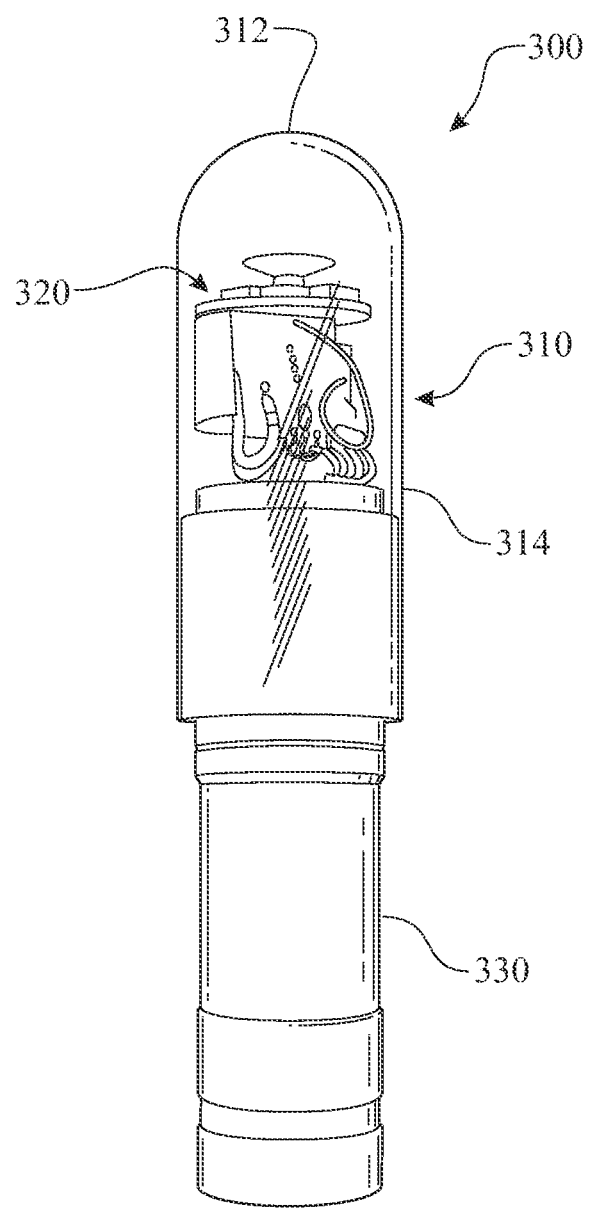
FIG. 5 presents an isometric view of a distress marker, in accordance with an alternative embodiment of the present invention.

An isometric view of another exemplary embodiment, referred to as a distress light 300, is illustrated in FIG. 5. The distress light 300 comprises a generally cylindrically shaped device comprising a transparent dome 310 attached to one end of a cylindrical body 330. The dome 310 includes a convex dome top 312 integrally formed with a dome body 314. The dome 310 may be fabricated from glass, a transparent plastic material, or any other transparent material suitable for the subject application. It will be noted that although the dome body 314 is shown attached to the outer end of cylindrical body 330, it is understood that the body 314 of the dome 310, may be alternatively attached or inserted within the cylindrical body 330. In one non-limiting example, a ferrule (not shown) may be inserted over the dome body 314 to secure the dome 310 to the cylindrical body 330. The cylindrical body 330 may be fabricated from any one of metal, aluminum, brass, stainless steel, plastic, or any other suitable material; in addition the cylindrical body 330 may also be coated with a waterproof or water resistant material.

In one embodiment, the cylindrical body 330, of the distress light 300, may be sized and dimensioned to fit within a standard one-inch (1") rifle stock clamp.

Figure 6:
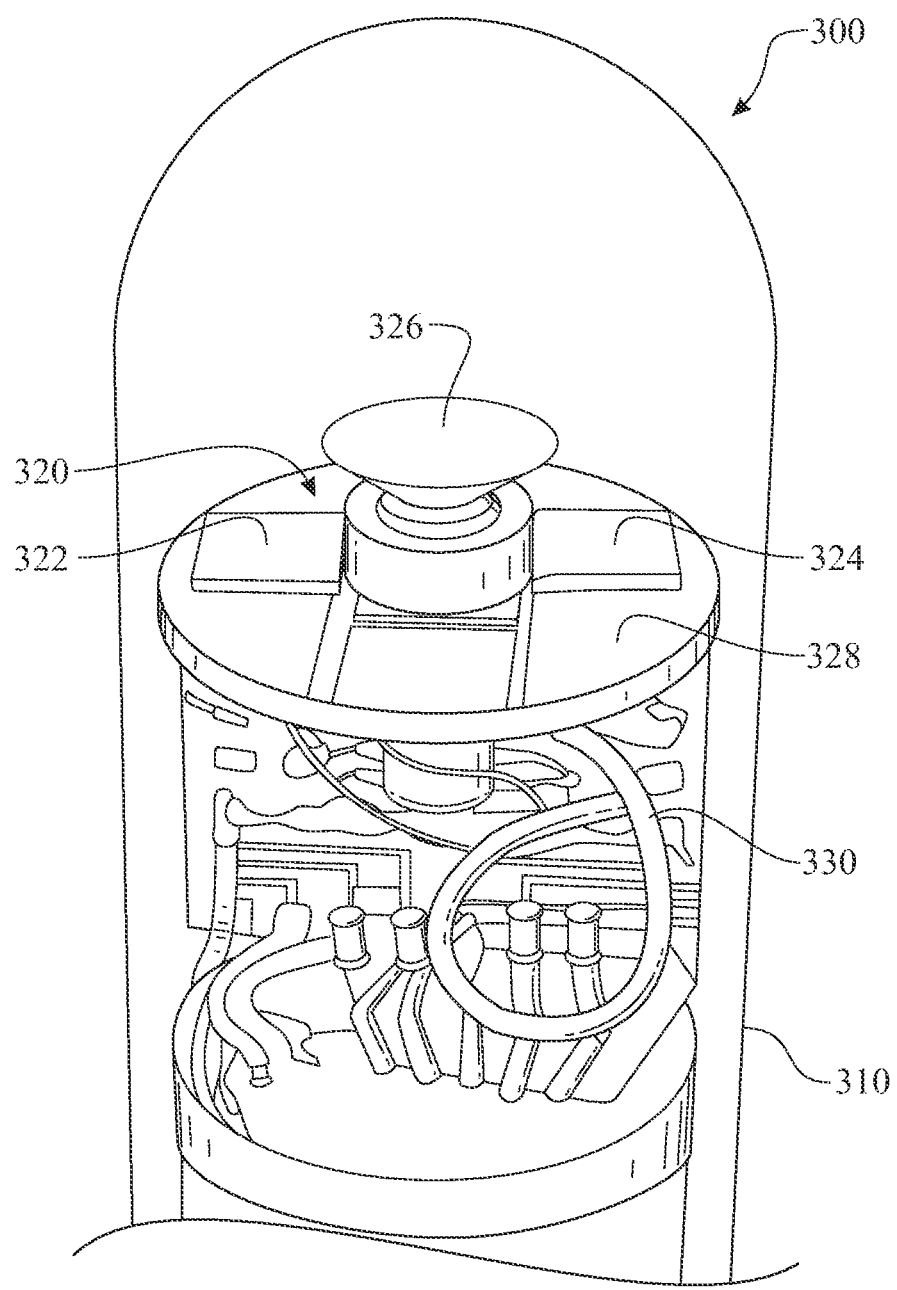
FIG. 6 presents a sectional view of the distress marker of FIG. 5, showing an enlarged view of a light assembly, according to one embodiment of the present invention.

A detailed view of the illuminating operational portion of the distress light 300 is presented in FIG. 6. The distress light 300 includes a light assembly 320 comprising a plurality of LED's 322, 324, 326 arranged and in electrical communication with a printed circuit board (PCB) 328. The light assembly 320 and corresponding circuitry is positioned at one end of the body 330 with the dome 310 integrated to protect the light assembly 320 from damage. In one exemplary embodiment, the light assembly 320 includes two top-emitting LED's 322, 324, and one side-emitting LED 326 to provide a light output. The light output can be of any of the series of white, IR, or blue light, having a plurality of LED's being the same color, a plurality of LED's each being a different output color, or a combination therewith. It will be noted that although FIG. 6, shows a hardwired LED light assembly 320, in a preferred embodiment, the LED light assembly 320 and circuitry 330 is compactly configured and engineered onto a semiconductor PCB layout using well known industrial processes.

Figure 7:
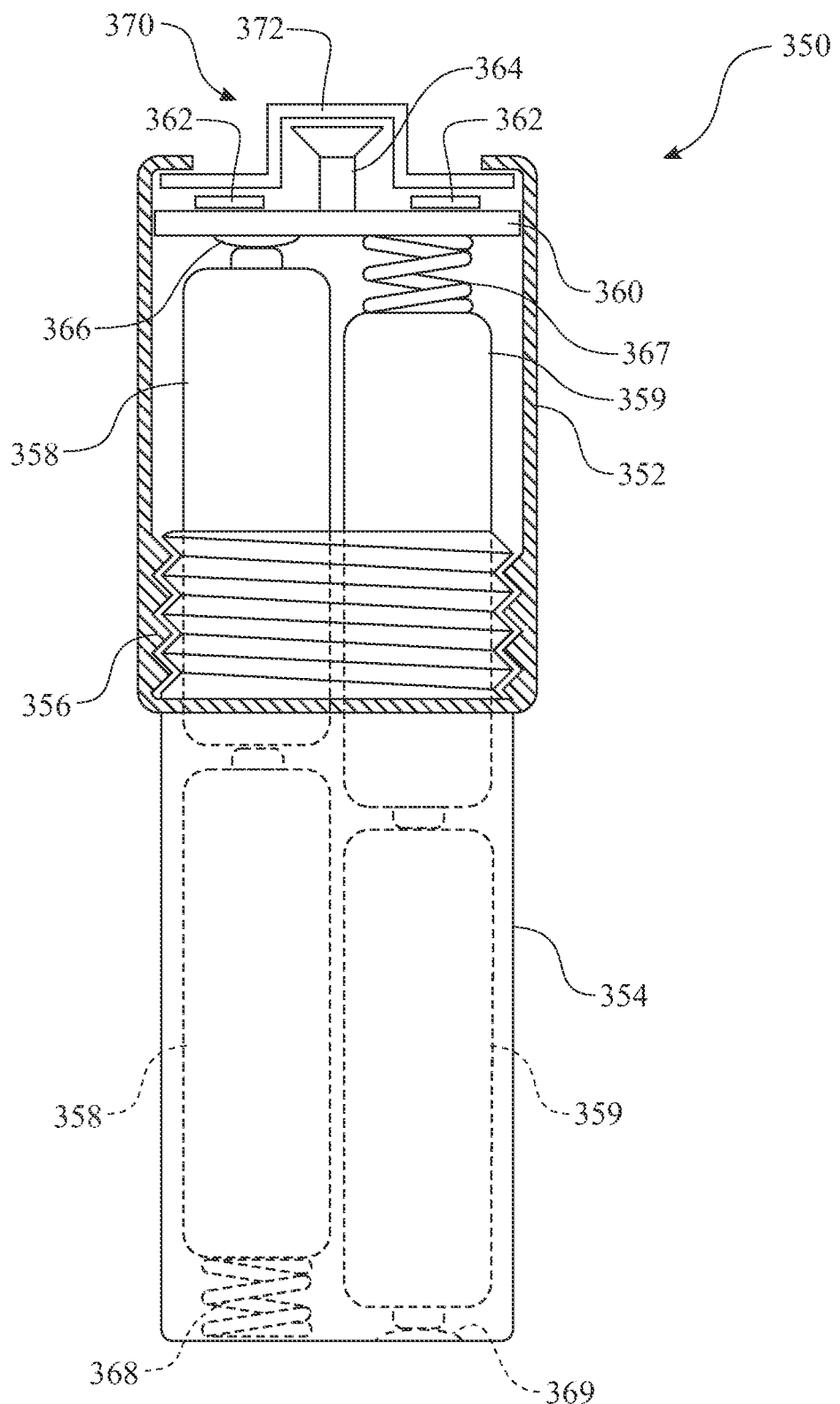
FIG. 7 presents a sectioned elevation view of a light assembly, according to an alternative embodiment of the present invention.

A sectioned elevation view of a distress light 350 is presented in FIG. 7. In the exemplary embodiment, the distress light 350 can be of any form factor, with the illustrated example comprising a two-piece housing. An upper housing portion 352 can be assembled to a lower housing portion 354 using any interlocking interface, such as a threaded interface 356. The two-piece housing is sized to accommodate at least one portable power cell 358. The distress light 350 includes a printed circuit assembly 360 having a side emitting diode 364, which is centrally located, and a pair of top emitting diodes 362, which are spatially located from the center. The side emitting diode 364 is positioned into a cylindrically shaped receiving section 372 of a lens 370. The top emitting diodes 362 are positioned in a manner to emit light axially through a planar portion of the lens 370. An electrical power contact 366 can be provided on an opposing side of the printed circuit assembly (PCA) 360 or in any other configuration having electrical communication with the printed circuit assembly (PCA) 360. A second electrical contact 368 is in electrical communication with the printed circuit assembly 360. It is understood a switch of any suitable form factor, such as those illustrated herein, can be included in the distress light 350. The printed circuit assembly (PCA) 360 can include the circuit (or portions thereof) described throughout the specification.

Figure 8:
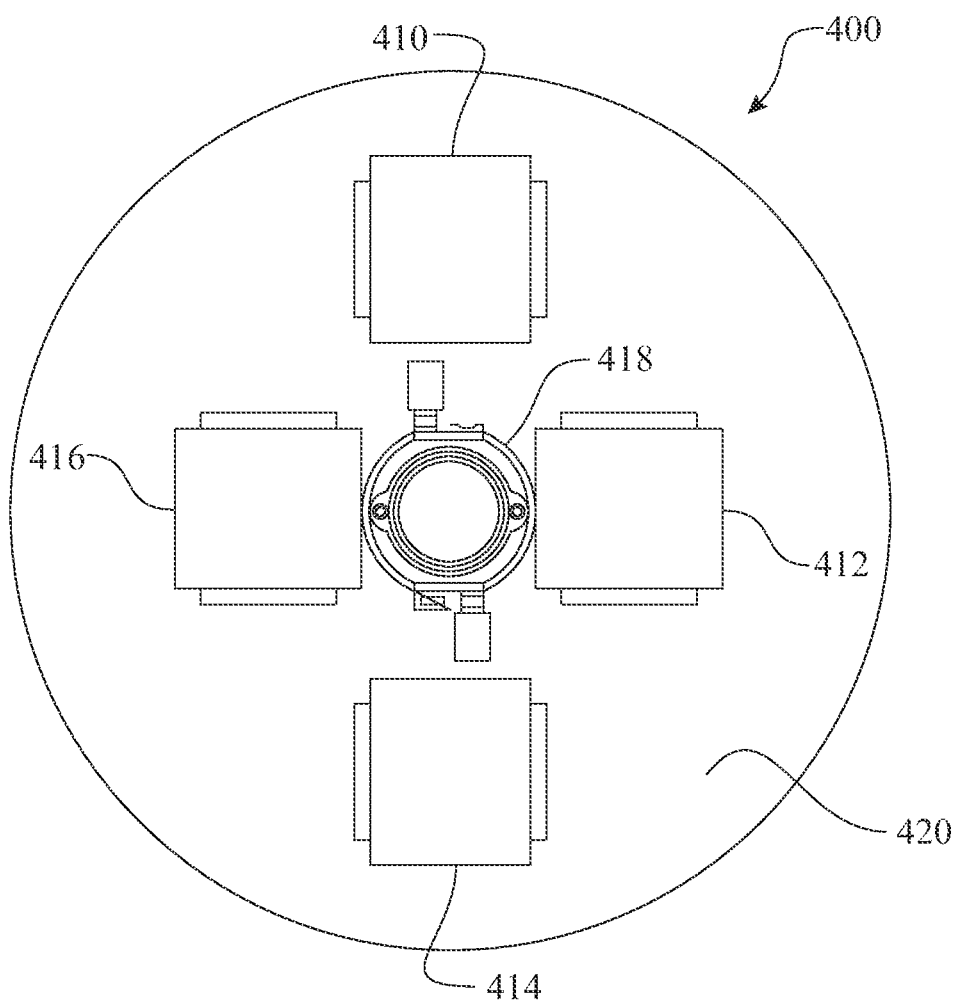
FIG. 8 presents a top elevation view of a light assembly, according to an alternative embodiment of the present invention.

A top elevation view of another exemplary embodiment, referred to as a light assembly 400, is presented in FIG. 8. In this exemplary embodiment, the light assembly 400 includes four top-emitting LED's 410, 412, 414, 416, selected to radiate light upwards, and one side-emitting LED 418, selected to radiate light outwards. The LED's 410, 412, 414, 416, 418 are arranged onto a printed circuit board (PCB) 420 to achieve an optimum hemisphere of light. As noted earlier, representative examples of top-emitting diodes includes the OVSPxBCR4 series diode from OPTEK Technology, Inc., and the side-emitting diode may include the LUXEON III series diode from the LumiLED's Lighting Company. The light assembly 400 is configured to selectively emit white light, IR light and blue light. In addition, the light assembly 400 may provide a strobe light via, a unique electrical circuit, and a bright flashlight illumination.

Figure 9A:
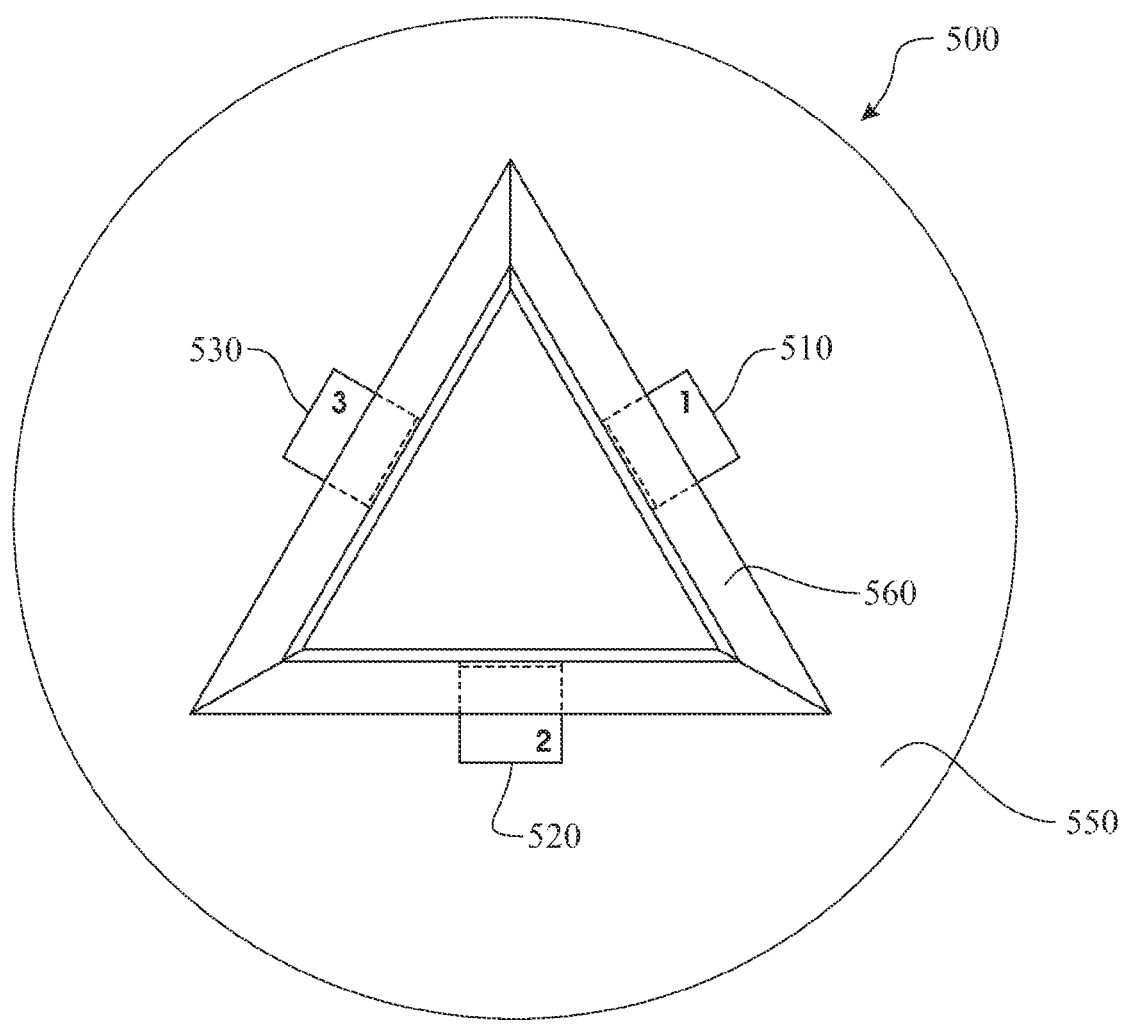
FIG. 9A presents a top elevation view of a triangular shaped reflector fixedly disposed over a plurality of LED devices, according to one embodiment of the present invention.
Figure 9B:
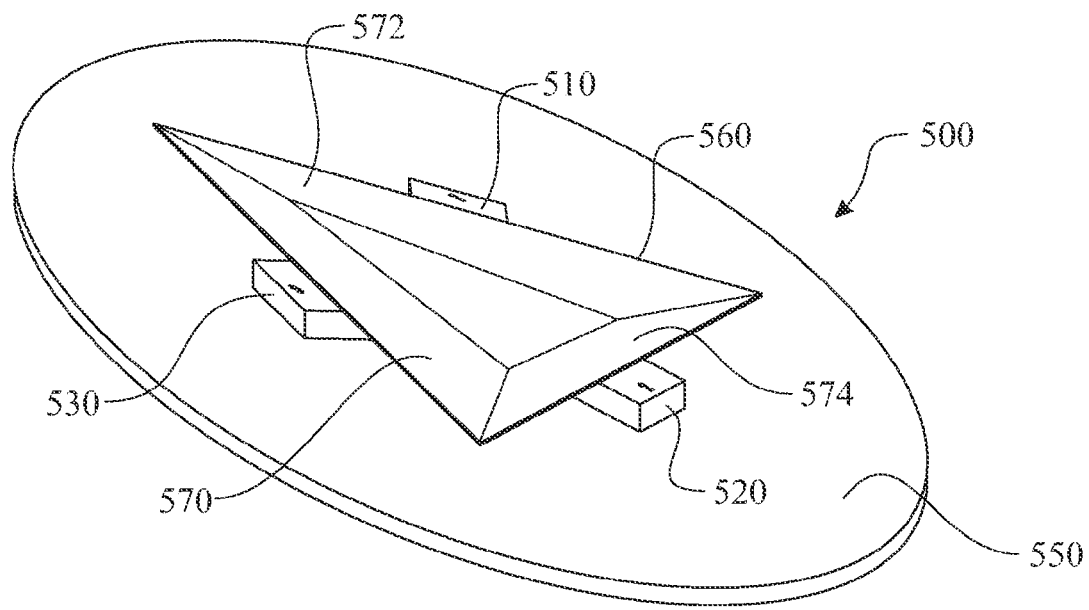
FIG. 9B presents a perspective view of a triangular shaped reflector fixedly disposed over a plurality of LED devices, according to one embodiment of the present invention.
Figure 9C:
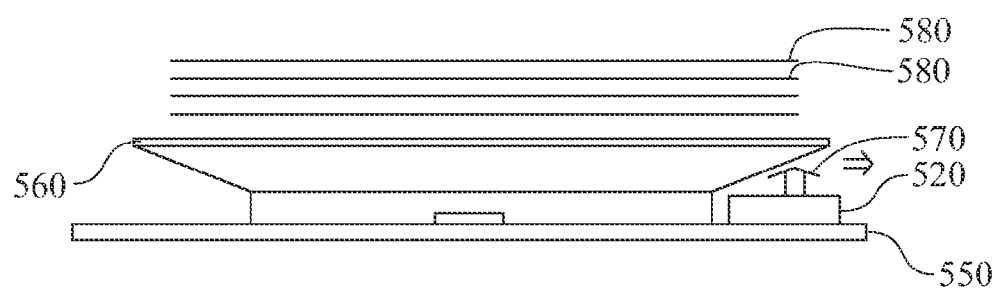
FIG. 9C presents a front elevation view of the triangular shaped reflector disposed over the plurality of LED devices of FIGS. 9a and 9b, showing a horizontal reflective light pattern.

Another exemplary embodiment, referred to as a light assembly 500, include a light reflector 560 and are presented in FIGS. 9A through 9C. A top elevation view of the exemplary light assembly 500 including a factory installed, triangular shaped reflector 560, is illustrated in FIG. 9A. The light assembly 500 includes three LED's 510, 520, and 530. The LED's 510, 520, and 530 may comprise top-emitting diodes, side-emitting diodes, or any combination thereof. Each LED 510, 520, 530 is physically oriented or arranged in a triangular format.

As better illustrated in an isometric view presented in FIG. 9B, each LED 510, 520, 530 is mounted onto a printed circuit board (PCB) 550. A generally triangular shaped reflector 560 is bound by edges 570, 572, 574. Each edge 570, 572, 574 is preferably formed having a 45 degree beveled surface and is mounted or disposed over the LED's 510, 520, 530. The generally triangular shaped reflector 560 is sized and shaped to cover a portion or all of the radiating surface of each LED 510, 520, and 530. In one non-limiting example, the reflector 560 covers approximately half of the radiating surface area of each LED 510, 520, and 530. The operative use of reflector 560 transforms vertically emitted light 570, from LED 510, 520, 530, into horizontally dispersed light waves 580, as better illustrated in the side elevation view presented in FIG. 9C. Thus, the reflector 560 is used to alter the vertically emitted light pattern into a horizontally dispersed light pattern. This alteration is beneficial where a 180-degree (hemisphere) of light may be desired.

Figure 10:
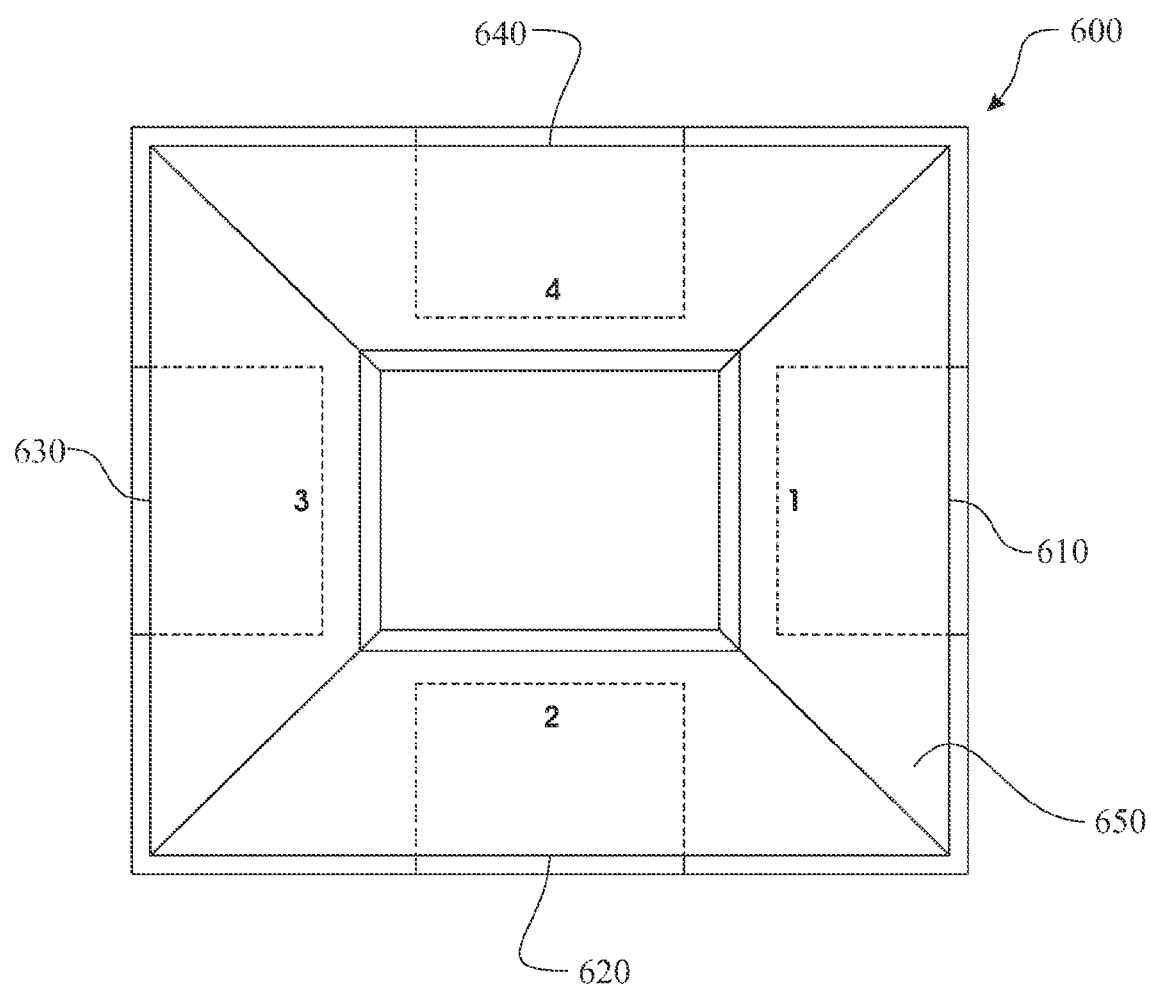
FIG. 10 presents a top elevation view of a generally rectangular reflector fixedly disposed over a first exemplary arrangement of a plurality of LED devices.
Figure 11:
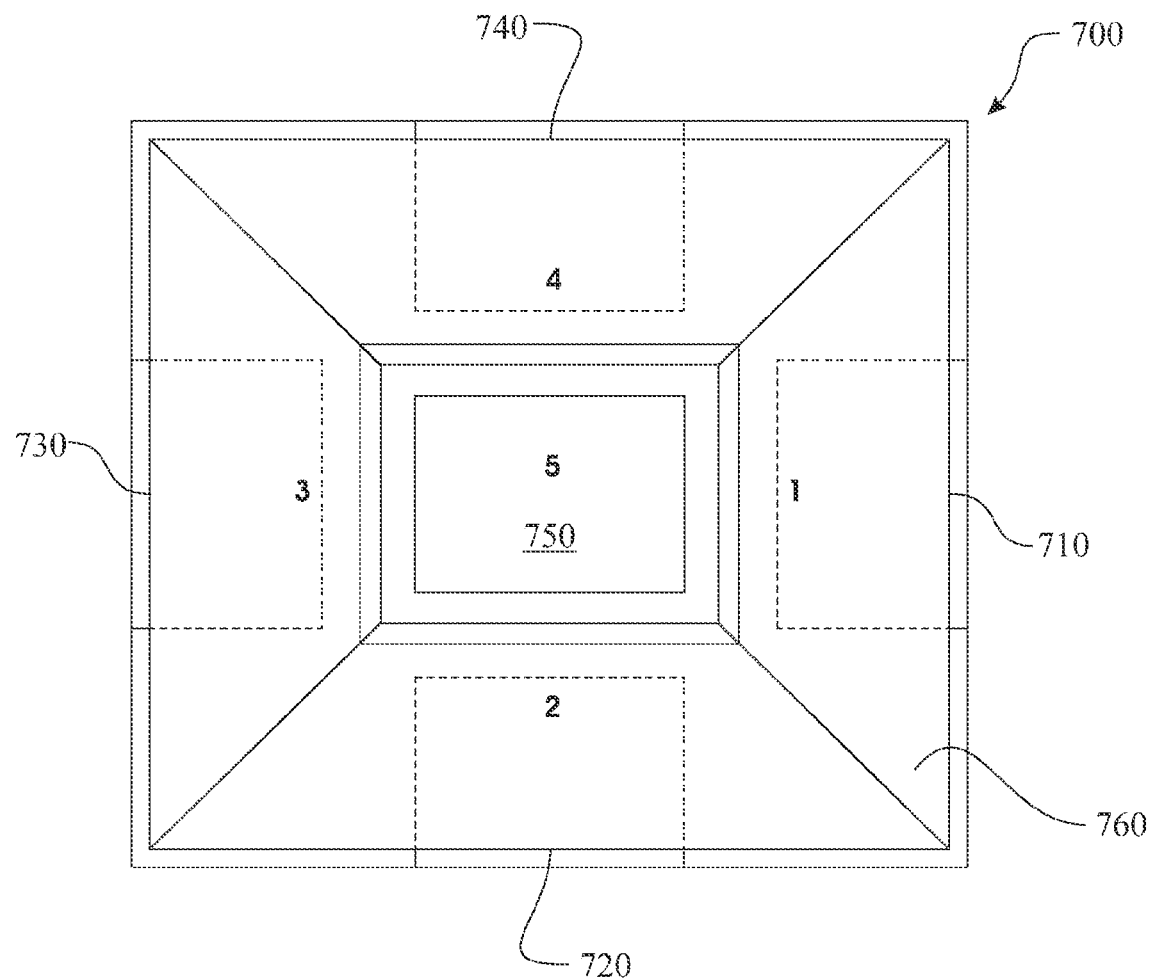
FIG. 11 presents a top elevation view of a generally rectangular reflector fixedly disposed over a second exemplary arrangement of a plurality of LED devices.

Two additional exemplary embodiments of another light assembly including a reflector are presented in top elevation views presented in FIGS. 10 and 11. As shown in FIG. 10, a light assembly 600 includes four LED's 610, 620, 630, and 640. The LED's 610, 620, 630 and 640 may comprise top-emitting diodes, side-emitting diodes, or any combination thereof. The LED's 610, 620, 630, 640 are mounted onto a PCB in any arrangement, such as a square or rectangular pattern or configuration. A reflector 650 is mounted over the LED's 610, 620, 630, 640 to cover a portion or all of the light emitting surface area of each LED 610, 620, 630 and 640. The reflector 650 may include a plurality of edges, each edge having a 45 degree beveled surface. In one alternative embodiment, the reflector 650 may extend beyond the four LED's 610, 620, 630, 640 to generate a strong horizontal beam of light.

A top elevation view of a light assembly with a reflector, referred to as a light assembly 700, is presented in FIG. 11. The elements and features of the light assembly 700 are similar to those of the light assembly 600, with the exception of an additional LED positioned in the center of the PCB 760 and in the center of a reflector 760. The exemplary light assembly 700 includes five LED's 710, 720, 730, 740, and 750. The LED's 710, 720, 730, 740, and 750 may comprise top-emitting diodes, side-emitting diodes, or any combination thereof. Each LED 710, 720, 730, 740, is mounted onto a PCB 760 in a square or rectangular pattern or format, with the centrally located LED 750 mounted in a central region thereof. A reflector 760 is mounted over the LED's 710, 720, 730, 740 to cover a portion or all of the light emitting surface area of each LED 710, 720, 730 and 740. The reflector 760 may include a plurality of edges, each edge having a 45 degree beveled surface. The beveled surfaces redirect the radiated light from a vertical pattern to a horizontal pattern. The reflector 760 may include a central opening for allowing LED 750 to radiate light upwards therethrough.

In summarizing the embodiments illustrated in FIG. 9A through FIG. 11, a light assembly may include a plurality of LED's 510, 520, 530, 610, 620, 630, 640, 710, 720, 730, 740, 750, that are arranged on a PCB in different configurations including a triangular configuration, a square configuration and a rectangular configuration where a reflector 560, 660, and 760 is mounted over each LED 510, 520, 530, 610, 620, 630, 640, 710, 720, 730, 740 to cover a portion or all of each LED's radiating surface area so as to provide a horizontal light pattern.

Figure 12A:
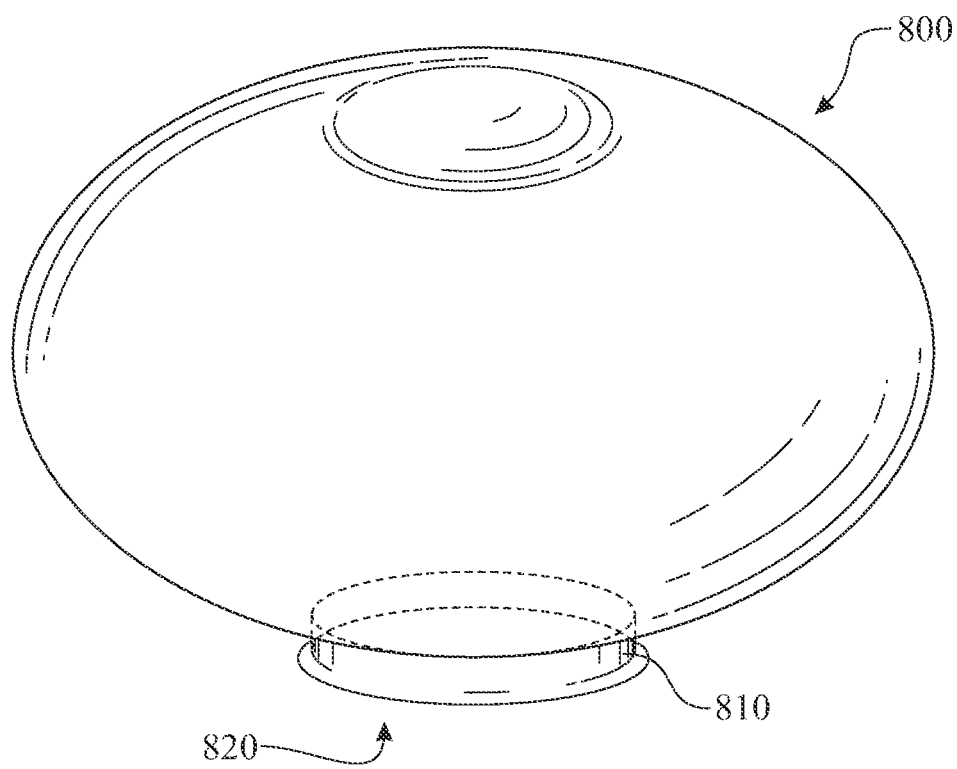
FIG. 12A presents an isometric view of a torridal light cover for use with the distress marker of the present invention.
Figure 12B:
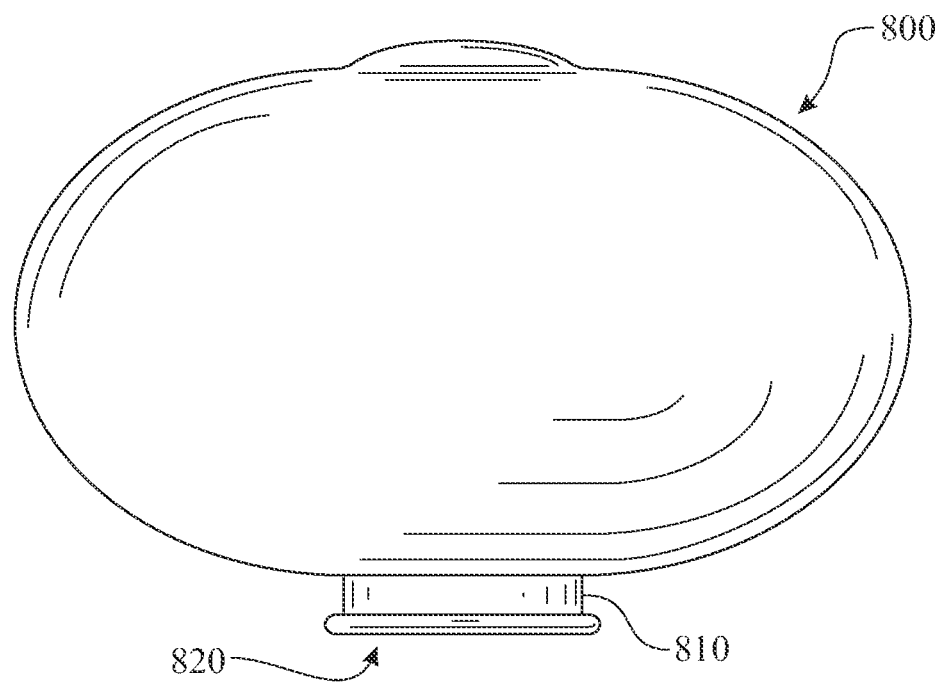
FIG. 12B presents a front elevation view of the torridal light cover, originally introduced in FIG. 12A for use with the distress marker of the present invention.

An alternative exemplary light cover 800, in a form of a torridal cover defining an oval style lens cover is presented in FIGS. 12A and 12B. The light cover 800 is shaped to include a neck section 810 and opening 820 for receiving a light assembly. In one non-limiting example, the torridal cover 800 is sized to attach to the cylindrical body 310 of the cylindrically shaped distress light 300, as illustrated in FIG. 6. The light cover 800 may be fabricated from glass, a clear, transparent plastic material, and the like. The light cover 800 would preferably include a fastening feature to securely fasten the cover 800 and the body 310 of the distress light 300 to one another. A reflecting material may be applied to the outer or inner surface of the cover 800 as a coating. The coating may be provided in any of a variety of different colors. The coating may be applied to the cover 800 in any size or shape. This light cover 800 may be used with one side-emitting LED 326 (FIG. 6).

Figure 13:
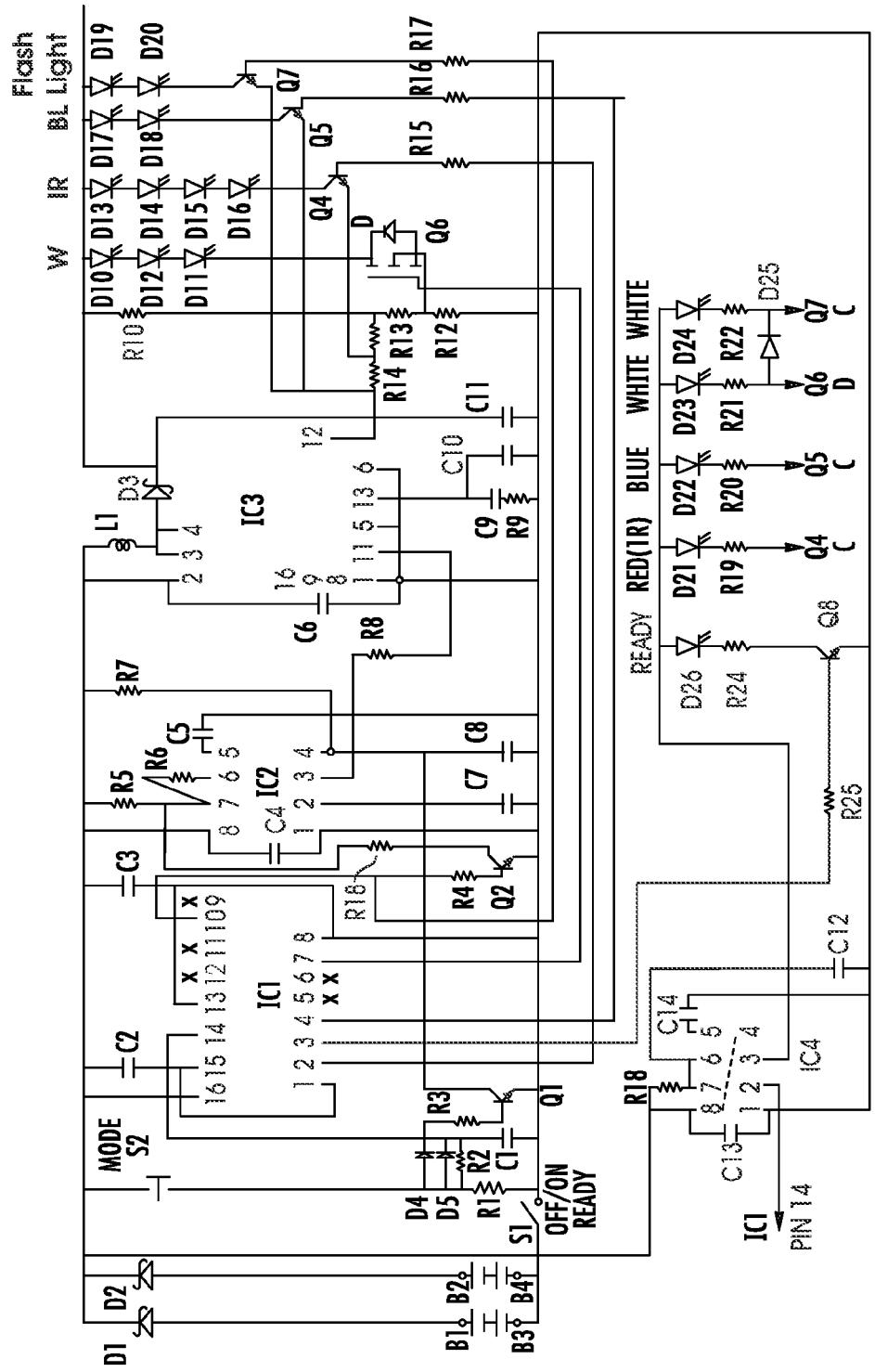
FIG. 13 presents an exemplary circuit diagram for operating the distress marker of FIG. 4, according to the present invention.

An exemplary circuit diagram of an operating circuit that is housed within distress light 200, 300 for operating LED's 224, 228, 230, 322, 324, 326, 410, 412, 414, 416, 418, 510, 520, 530, 610, 620, 630, 640, 710, 720, 730, 740, 750, and status indicators 238 is presented in FIG. 13. As illustrated, the power source circuit section includes a series of Schottky diodes D1, D2 plus four CR-123 batteries B1, B2, B3, B4 displaced in two parallel sets of two series strings. The circuit may be operated with 2 or 4 CR-123 batteries. The power source circuit allows batteries to be inserted and replaced in the same polarity direction, providing the convenience of easily and quickly replacing batteries without regard to inserting the batteries in different specific polarity orientations. In one embodiment, the power source comprises two batteries, with two other batteries 359 positioned in opposite polarity between an electrical power contact 367 and a second electrical power contact 369 for storage.

The operating circuit shows mode switch S2 coupled to a 555 timer to provide a five (5) second delay mode activation. Each time mode switch S2 is depressed, a five (5) second delay is evoked for each new mode selection. Upon depressing the mode switch 234, as better illustrated in FIG. 4, a five (5) second delay is provided before activating the selected mode of operation. The five (5) second delay offers the advantages of reducing selection errors and risks of exposure that may be created from selecting a bright, white illumination. For example, a user may select the bright white light mode of operation and realize quickly thereafter, that selecting such a mode may alert unfriendly forces. Thus, a user could reselect the proper mode within the five (5) second delay without having triggered the undesired mode.

The operating circuit further includes a number of integrated circuits (ICs). IC1 is a decade counter that provides the appropriate output to operate a variety of transistors and/or FETs to operate light emitting diodes. IC2 is a flash rate control integrated circuit that controls the pulsing, time and frequency of lighting the light emitting diodes. IC3 is a voltage regulator that powers the output light emitting diodes and while additionally functions as a current regulator through the combinational workings of resistors R11 through R14. The arrangement allows changing a constant voltage regulator to a current regulator with current settings independent of the load applied. It is desirable that the circuit powers the plurality of light emitting diodes at a pulse rate between 7 and 13 flashes per second. In an alternative embodiment, it is desirable that the circuit powers the plurality of light emitting diodes at a pulse rate having a minimum of at least one (1) flash every two (2) seconds.

As seen in FIG. 13, the operating circuit includes light emitting diodes D10 through D20. D10 through D12 provide a white flashing light, D13 through D16 provide an infrared flashing light, D17 and D18 provide a Blue flashing light, and D19 and D20 provide a white solid light. A number of resistors, capacitors, transistors, and diodes are electrically coupled to provide a unique operational circuit for distress light 200 and 300.

In view of the circuit, a delay in the operation of the selected mode is provided by the mode switch S2 which, when placed in a closed circuit, drives Transistor Q1 to cause capacitor C8 to discharge. The low voltage across Capacitor C8 applied to the reset pin of integrated circuit IC2 causes Pin 3 of integrated circuit IC2 drives the output to a low state. The output of integrated circuit IC2 drives the enable pin (pin 11) of integrated circuit IC3 to a low state, which shuts down integrated circuit IC3. When mode switch S2 is placed in an open position, transistor Q1 converts to an "off" state and Capacitor C8 charges through resistor R7. Capacitor C8 and Resistor R7 are selected such to provide a 5 second delay before Capacitor C8 reaches a charge voltage sufficient to allow Integrated Circuit IC2 to function as an astabe circuit. Integrated Circuit IC2 controls the on time and flash rate of the LED's when they are in the flashing mode.

Continuing with the circuit, the status indicator operation is controlled by IC4. The integrated circuit IC4 operates as a monostable single pulse generator. This single pulse provides 5 seconds of positive voltage to power the selected status LED's. When the mode switch S2 is closed, this provides a positive pulse to pin 2 of the integrated circuit IC4. The positive pulse is provided via capacitor C1 charging through diode D5. Pin 2 of the integrated circuit IC4 only responds to a negative pulse, thus waiting until the positive pulse is removed. When the mode switch S2 opens, capacitor C1 discharges through resistors R1, R2. The discharge provides the required negative pulse to the pin 2 of the integrated circuit IC4, causing pin 3 of the integrated circuit IC4 to provide a positive five (5) second pulse, powering the mode status LED's, D21, D22, D23, D24, and D26. This limits the mode status indicating LEDS to a 5 second or less illumination. The operational timeframe of the mode indicating LEDS is limited to minimize any potential for accidental location identification by undesirable parties.

Operation of the mode selection function, selecting the operational LED's initiates when the power switch S1 is placed into a ready position. Once the power switch S1 is placed into a ready position, power is provided to the decade counter IC1. This causes the decoded output "0" of pin 3 to enter a high or "+" state (referenced as "1" when using a logical or digital state). All other outputs are toggled into a low or "−" state (referenced as "0" when using a logical or digital state). The high state of pin 3 provides power to transistor Q8, which provides power to the ready mode status indicator D26. When the mode switch S2 is cycled (pressed and released), pin 14 of integrated circuit IC1 receives a pulse. Pin 14 of integrated circuit IC1 is a clocking input. The received pulse resets the decoded output "0" from a logic state of "1" to a logic state of "0". The next sequenced output "1" is toggled from a logic state of "0" to a logic state of "1", with the balance remaining as a logic state of "0". This continues through all five of the preset outputs. This stepping sequence initiates power to the next sequentially desired light display/output. The following illustrates an exemplary sequence of outputs:

a. Output "0" (Pin 3 of IC1) powers the ready light D26
b. Output "1" (Pin 2 of IC1) powers the IR flashing light and IR indicator (red) LED's D21
c. Output "2" (Pin 4 of IC1) powers the blue flashing light and blue indicator LED D22
d. Output "3" (Pin 7 of IC1) powers the white flashing light and white indicator LED D23
e. Output "4" (Pin 10 of IC1) power the white steady light and white indicator (flashlight) LED's D23, D24
f. Output "5" (Pin 1 of IC1) is connected to a reset input (Pin 15 of IC1), which causes the sequence to reset and repeat.

It is understood that the mode indicator lights can be incorporated into a single multi-colored LED, utilising a respective circuit.

Figure 14:
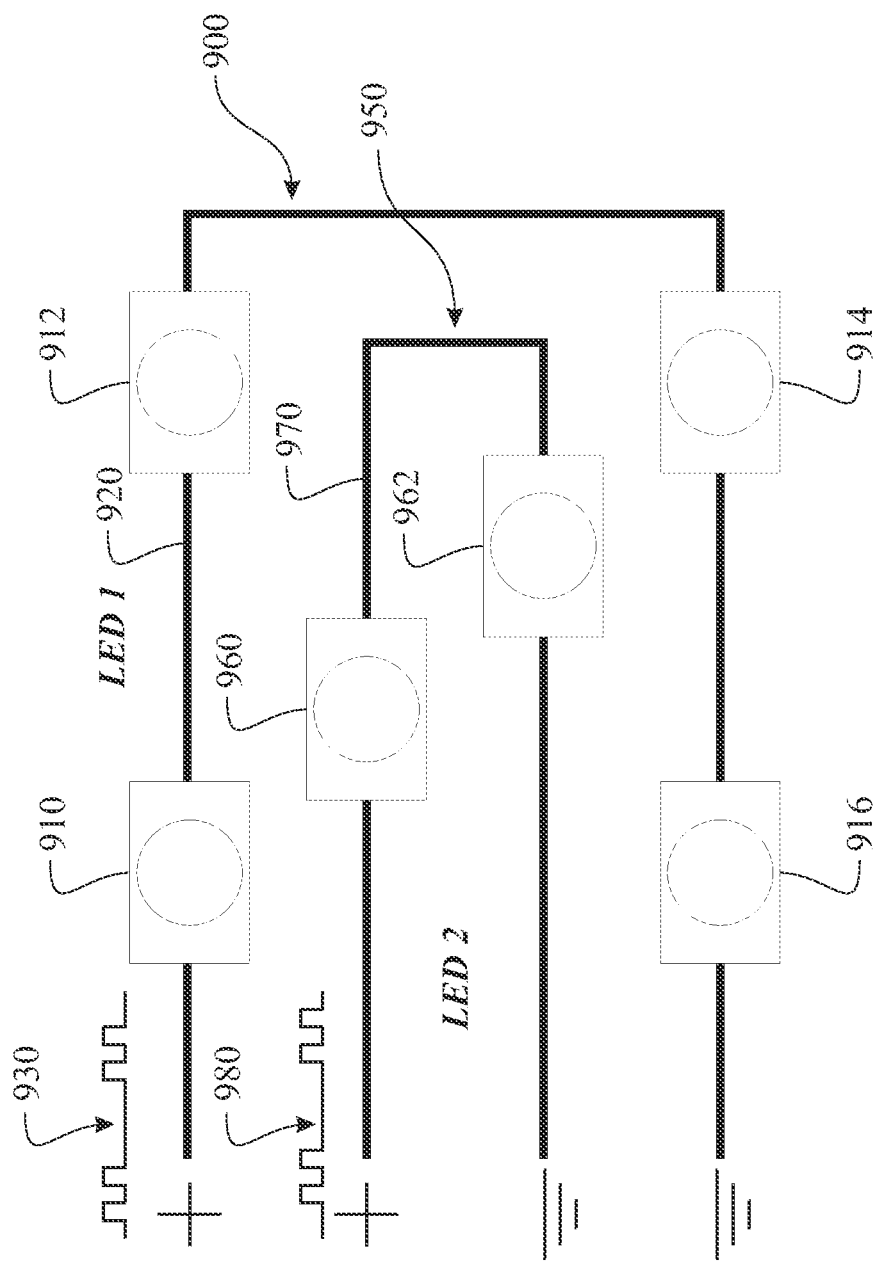
FIG. 14 presents an exemplary strobing illumination system comprising a pair of LED circuits.
Figure 15:
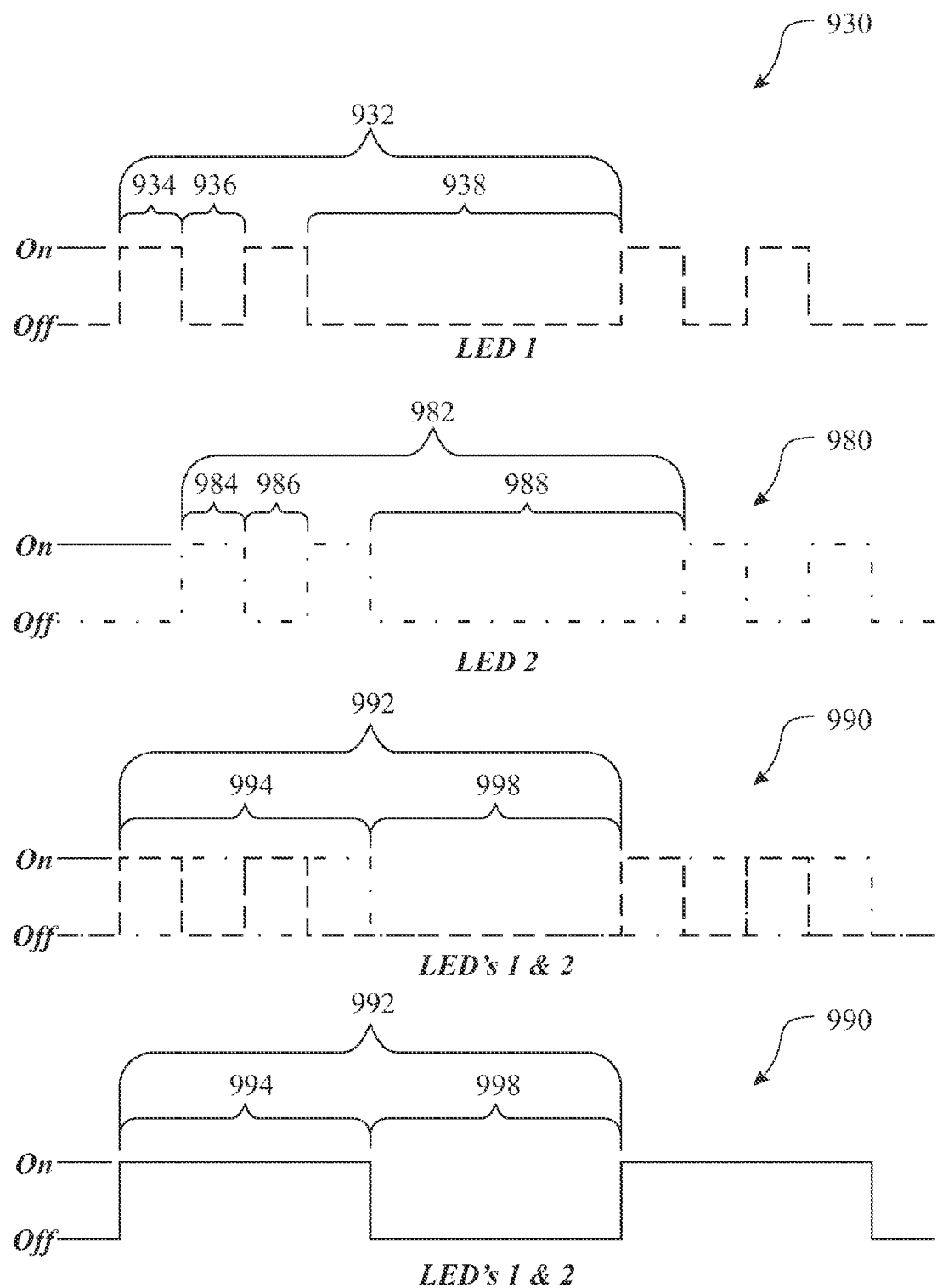
FIG. 15 presents an exemplary illuminating waveform illustrating the operation of the pair of LED circuits of the strobing illumination system.

The portable distress light 200, 300, 350 can include an enhanced light assembly, where the enhancement of the light assembly 222, 320, 400, 500, 600, 700 includes a strobing illumination system comprising a pair of light emitting element circuits 900, 950 (also referred to as an LED circuit for clarity, but should not be considered as limiting) as illustrated in FIG. 14. The enhanced light assembly includes a first illuminating LED circuit 900 and a second illuminating LED circuit 950. The first illuminating LED circuit 900 includes at least one light-emitting element, preferably a light emitting diode (LED). The exemplary first illuminating LED circuit 900 includes four LED's 910, 912, 914, 916. The at least one light emitting element is provided in operative communication with a controller (not shown) via a series of first circuit electrical conductors 920. When including a plurality of light emitting elements, the circuit can place the arrangement of the plurality of light emitting elements 910, 912, 914, 916 in either a parallel circuit arrangement or a serial circuit arrangement. The first illuminating LED circuit 900 is designed to operate in accordance with a first circuit waveform 930.

Similarly, the second illuminating LED circuit 950 includes at least one light-emitting element, preferably a light emitting diode (LED). The exemplary second illuminating LED circuit 950 includes a pair of LED's 960, 962. The at least one light emitting element is provided in operative communication with a controller (not shown) via a series of second circuit electrical conductors 970. When including a plurality of light emitting elements, the circuit can place the arrangement of the plurality of light emitting elements 960, 962 in either a parallel circuit arrangement or a serial circuit arrangement. The second illuminating LED circuit 950 operates in accordance with a second circuit waveform 980.

The first illuminating LED circuit 900 and second illuminating LED circuit 950 operate in unison to provide a single strobing pattern. The first illuminating LED circuit 900 operates the series of LED's 910, 912, 914, 916 in accordance with the first circuit waveform 930. The second illuminating LED circuit 950 operates the series of LED's 960, 962 in accordance with the second circuit waveform 980. The sum of the light pattern emitted in accordance with the first circuit waveform 930 and the light pattern emitted in accordance with the second circuit waveform 980 is reflected as a light pattern emitted in accordance with a combined LED illumination waveform 990.

The first circuit waveform 930 includes a first waveform pulse cycle 932, which is repeated over the operational span of time. The first waveform pulse cycle 932 consists of at least one first LED shared illumination contribution pulse 934 and a first LED shared off pulse 938. In a condition where the first waveform pulse cycle 932 consists of a plurality of first LED shared illumination contribution pulses 934, a first LED shared illumination passive pulse 936 is provided between each adjacent first LED shared illumination contribution pulse 934. Each of the first LED shared illumination contribution pulse 934 contributes to a combined LED illumination wave segment 994 of the combined LED illumination waveform 990. The first LED shared off pulse 938 is provided to contribute to a combined LED passive wave segment 998 of the combined LED illumination waveform 990. Although the exemplary embodiment presents a pair of first LED shared illumination contribution pulses 934 separated by a single first LED shared illumination passive pulses 936, it is understood that the first circuit waveform 930 can include any number of first LED shared illumination contribution pulses 934 and first LED shared illumination passive pulses 936 prior to the first LED shared off pulse 938. Similarly, the second circuit waveform 980 includes a second waveform pulse cycle 982, which is repeated over the operational span of time. The second waveform pulse cycle 982 consists of at least one second LED shared illumination contribution pulse 984 and a second LED shared off pulse 988. In a condition where the second waveform pulse cycle 982 consists of a plurality of second LED shared illumination contribution pulses 984, a first LED shared illumination passive pulse 936 is provided between each adjacent second LED shared illumination contribution pulse 984. Each of the second LED shared illumination contribution pulse 984 contributes to a combined LED illumination wave segment 994 of the combined LED illumination waveform 990. The second LED shared off pulse 988 is provided to contribute to a combined LED passive wave segment 998 of the combined LED illumination waveform 990. Although the exemplary embodiment presents a pair of second LED shared illumination contribution pulses 984 separated by a single second LED shared illumination passive pulses 986, it is understood that the second circuit waveform 980 can include any number of second LED shared illumination contribution pulse 984 and second LED shared illumination passive pulses 986 prior to the second LED shared off pulse 988.

The frequency of operation of each of the first circuit waveform 930 and the second circuit waveform 980 are preferably the same. The first circuit waveform 930 and the second circuit waveform 980 would be timed, where in operation, the first LED shared illumination contribution pulse 934 and second LED shared illumination contribution pulse 984 combine to create a combined LED illumination wave segment 994, where the combined LED illumination wave segment 994 appears to be a continuous illuminated segment. The overlap between the first LED shared off pulse 938 and second LED shared off pulse 988 combine to form a combined LED passive wave segment 998, where the combined LED passive wave segment 998 appears to be a dark or non-illuminated segment.

The light emitting elements 910, 912, 914, 916, 960, 962 can be of any form factor, including an incandescent bulb, an light emitting diode (LED), a top emitting diode, a side emitting diode, and the like. A reflector can be assembled about the light emitting elements 910, 912, 914, 916, 960, 962 as previously described.

Although the exemplary embodiment presents a pair of illuminating LED circuits 900, 950, it is understood that the system can include any number of illuminating LED circuits 900, 950 to accomplish the combined LED illumination waveform 990.

Although the illustrated waveforms 930, 980 are presented having square waveform segments, it is understood that the actual waveform segments may vary, comprising a ramp up and ramp down. Each of the illuminated pulses can be modified to ensure that the entire illuminated span of time would overlap, wherein the rise and fall would be compensated for accordingly.

It is understood that the combined LED passive wave segment 998 can be set to a zero span of time (effectively eliminating the off time of the combined illuminated pulse), converting the strobing light into an appearance of a solid, continuously emitted light, thus operating as a flashlight. Alternately, the strobing circuitry can be combined with a circuit of a standard solid, continuously emitted light of a flashlight, wherein the flashlight includes at least two illuminating elements, wherein the illuminating elements are included in at least two separate circuits, to provide a combined system with multiple operational settings.

In yet another embodiment, one or more light emitting elements (preferably in a form of an LED) can pulse at a significantly high rate (such as at a rate of approximately 300-750 times per second) at approximately a fifty percent (50%) duty cycle to create a perception of a solid emitted light to an individual, while significantly reducing the power consumption of the lighting assembly.

One or more embodiments of the present invention are disclosed herein. It will be understood that the claims and embodiments of the present invention are intended to be coextensive with each other, and that the embodiments are merely exemplary of the invention that may be embodied in various and alternative forms. It is noted that, according to common practice, the various features, elements and dimensions of particular embodiments are not to scale, and may be expanded, exaggerated or minimized for clarity. Thus, specific structural and functional details, dimensions, shapes, or configurations disclosed herein are not limiting but serve as a basis for teaching a person of ordinary skill in the art the described and claimed features of embodiments of the present invention.

What is claimed is:

1. A portable distress light comprising:
  a housing holding a power source and a circuit;
  a light assembly disposed on one end of said housing, said light assembly including:
    at least one first circuit illuminating element coupled to a first illuminating circuit, wherein said circuit operates said at least one first circuit illuminating element in accordance with a first circuit waveform;
    the first circuit waveform comprising a series of first waveform pulse cycles, each first waveform pulse cycle comprising a first light emitting shared illumination contribution pulse, a first light emitting shared illumination passive pulse, and a first light emitting shared off pulse, wherein operation of said at least one first circuit illuminating element presents a first circuit illuminating element illumination pattern;
    at least one second circuit illuminating element coupled to a second illuminating circuit, wherein said circuit operates said at least one second circuit illuminating element in accordance with a second circuit waveform;
    the second circuit waveform comprising a series of second waveform pulse cycles, each second waveform pulse cycle comprising a second light emitting shared illumination passive pulse, a second light emitting shared illumination contribution pulse, and a second light emitting shared off pulse, wherein operation of said at least one second circuit illuminating element presents a second circuit illuminating element illumination pattern, wherein said a first light emitting shared illumination contribution pulse overlaps said second light emitting shared illumination contribution pulse, said first light emitting shared illumination passive pulse overlaps said second light emitting shared illumination contribution pulse and said first light emitting shared off pulse overlaps said second light emitting shared off pulse;
    the first circuit illuminating element illumination pattern and said second circuit illuminating element illumination pattern combine to form a combined light emitting illumination waveform comprising a series of combined light emitting illumination waveform pulse cycle, each comprising a combined light emitting illumination wave segment and a combined light emitting passive wave segment, wherein said combination of said first light emitting shared illumination contribution pulse, said second light emitting shared illumination contribution pulse, said first light emitting shared illumination passive pulse and said second light emitting shared illumination contribution pulse collectively form said combined light emitting illumination wave segment and said combination of first light emitting shared off pulse and said second light emitting shared off pulse form said combined light emitting passive wave segment.

2. The portable distress light of claim 1, wherein at least one of said at least one first circuit illuminating elements is a light emitting diode (LED).

3. The portable distress light of claim 2, wherein said LED is at least one of a top emitting diode and a side emitting diode.

4. The portable distress light of claim 2, said light assembly including at least two first circuit illuminating elements, wherein one of said at least two first circuit illuminating elements is a top emitting diode and a second of said at least two first circuit illuminating elements is a side emitting diode.

5. The portable distress light of claim 1, said at least one first circuit illuminating element and said at least one second circuit illuminating element are configured to provide different lighting modes including at least two of a flashing white light, a flashing infrared (IR) light, a flashing blue light, a flashing colored light, a steady colored light, and a solid white light.

6. The portable distress light of claim 1, said portable distress light further comprising a control circuit incorporating at least one of a delay circuit, a status indicator circuit, and a mode selection circuit for selectively powering said plurality of circuit illuminating elements to provide different lighting modes.

7. The portable distress light of claim 1, said portable distress light further comprising a control circuit incorporating a delay circuit, wherein said delay circuit provides a five second delay in operation of said mode selection circuit such that there is a five second lapse before said mode selection circuit can selectively power a desired lighting mode.

8. The portable distress light of claim 1, wherein said combined light emitting illumination waveform powers operates at a pulse rate having a minimum of one (1) flash every two (2) seconds.

9. The portable distress light of claim 1, said portable distress light further comprising a reflector disposed about at least one of said at least one first circuit illuminating element and said at least one second circuit illuminating element, wherein said reflector is oriented to aid in directing light emitted from at least one of said at least one first circuit illuminating element and said at least one second circuit illuminating element.

10. The portable distress light of claim 1, said portable distress light further comprising a reflector disposed about at least one of said at least one first circuit illuminating element and said at least one second circuit illuminating element, wherein said reflector is oriented to provide a hemisphere of light, a 360 degree horizontal beam of light, and a vertical beam of light, said reflector including any one of a generally triangular shape, a generally square shape or a generally rectangular shape.

11. The portable distress light of claim 1, said portable distress light further comprising a housing, said housing is fabricated from a durable, waterproof, lightweight material, said housing further including an attaching member for carrying or attaching said distress light to a person or object.

12. The portable distress light of claim 1, said portable distress light further comprising a transparent cover placed over said light assembly, wherein said transparent cover is a torridal shaped lens.

13. A generally cylindrically-shaped distress light comprising:

a cylindrical housing holding a power source and a controller circuit;

a light assembly disposed on one end of said housing, said light assembly including:

at least one first circuit illuminating diode coupled to a first illuminating circuit in operational communication with said controller circuit, wherein said circuit operates said at least one first circuit illuminating diode in accordance with a first circuit waveform;

the first circuit waveform comprising a series of first waveform pulse cycles, each first waveform pulse cycle comprising a first light emitting shared illumination contribution pulse, a first light emitting shared illumination passive pulse, and a first light emitting shared off pulse, wherein operation of said at least one first circuit illuminating diode presents a first circuit illuminating diode illumination pattern;

at least one second circuit illuminating diode coupled to a second illuminating circuit in operational communication with said controller circuit, wherein said circuit operates said at least one second circuit illuminating diode in accordance with a second circuit waveform;

the second circuit waveform comprising a series of second waveform pulse cycles, each second waveform pulse cycle comprising a second light emitting shared illumination passive pulse, a second light emitting shared illumination contribution pulse, and a second light emitting shared off pulse, wherein operation of said at least one second circuit illuminating diode presents a second circuit illuminating diode illumination pattern, wherein said a first light emitting shared illumination contribution pulse overlaps said second light emitting shared illumination contribution pulse, said first light emitting shared illumination passive pulse overlaps said second light emitting shared illumination contribution pulse and said first light emitting shared off pulse overlaps said second light emitting shared off pulse;

the first circuit illuminating diode illumination pattern and said second circuit illuminating diode illumination pattern combine to form a combined light emitting illumination waveform comprising a series of combined light emitting illumination waveform pulse cycle, each comprising a combined light emitting illumination wave segment and a combined light emitting passive wave segment, wherein said combination of said first light emitting shared illumination contribution pulse, said second light emitting shared illumination contribution pulse, said first light emitting shared illumination passive pulse and said second light emitting shared illumination contribution pulse collectively form said combined light emitting illumination wave segment and said combination of first light emitting shared off pulse and said second light emitting shared off pulse form said combined light emitting passive wave segment;

a transparent lens disposed over said plurality of light emitting diodes; and a power source provided within said cylindrical housing, said power source being selectively coupled to said control circuit for selectively powering said plurality of light emitting diodes.

14. The portable distress light of claim 13, wherein said plurality of light emitting diodes are at least one of a top emitting diode and a side emitting diode.

15. The portable distress light of claim 14, said light assembly including at least two first circuit illuminating elements, wherein one of said at least two first circuit illuminating elements is a top emitting diode and a second of said at least two first circuit illuminating elements is a side emitting diode.

16. The portable distress light of claim 13, said at least one first circuit illuminating element and said at least one second circuit illuminating element are configured to provide different lighting modes including at least two of a flashing white light, a flashing infrared (IR) light, a flashing blue light, a flashing colored light, a steady colored light, and a solid white light.

17. The portable distress light of claim 13, said portable distress light further comprising a control circuit incorporating at least one of a delay circuit, a status indicator circuit, and a mode selection circuit for selectively powering said plurality of circuit illuminating elements to provide different lighting modes.

18. The portable distress light of claim 13, said portable distress light further comprising a control circuit incorporating a delay circuit, wherein said delay circuit provides a five second delay in operation of said mode selection circuit such that there is a five second lapse before said mode selection circuit can selectively power a desired lighting mode.

19. The portable distress light of claim 13, wherein said combined light emitting illumination waveform powers operates at a pulse rate having a minimum of one (1) flash every two (2) seconds.

20. The portable distress light of claim 13, said portable distress light further comprising a reflector disposed about at least one of said at least one first circuit illuminating element and said at least one second circuit illuminating element, wherein said reflector is oriented to aid in directing light emitted from at least one of said at least one first circuit illuminating element and said at least one second circuit illuminating element.

* * * * *